*(12)* United States Patent
Liao et al.

(10) Patent No.: US 11,902,063 B2
(45) Date of Patent: Feb. 13, 2024

(54) PDCCH DMRS MAPPING AND CORESET RESOURCE ALLOCATION

(71) Applicant: Mediatek Inc., Hsin-Chu (TW)

(72) Inventors: Yiju Liao, Hsinchu (TW); Chien Hwa Hwang, Hsinchu (TW); Chien-Chang Li, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 244 days.

(21) Appl. No.: 17/324,397

(22) Filed: May 19, 2021

(65) Prior Publication Data

US 2021/0273835 A1   Sep. 2, 2021

Related U.S. Application Data

(62) Division of application No. 16/191,640, filed on Nov. 15, 2018, now Pat. No. 11,018,910.
(Continued)

(51) Int. Cl.
 *H04L 27/14* (2006.01)
 *H04L 5/00* (2006.01)
(Continued)

(52) U.S. Cl.
 CPC ............ *H04L 27/14* (2013.01); *H04L 5/0048* (2013.01); *H04L 5/0051* (2013.01); *H04L 5/0053* (2013.01); *H04L 5/0094* (2013.01); *H04L 25/0202* (2013.01); *H04W 76/27* (2018.02); *H04L 5/001* (2013.01); *H04L 5/0007* (2013.01); *H04W 80/02* (2013.01)

(58) Field of Classification Search
None
See application file for complete search history.

(56) References Cited

U.S. PATENT DOCUMENTS

| 2018/0063818 A1* | 3/2018 | Chen ..................... H04W 24/02 |
| 2018/0227156 A1* | 8/2018 | Papasakellariou .... H04L 5/0053 |
| 2019/0037540 A1* | 1/2019 | Seo .................... H04W 72/1273 |

FOREIGN PATENT DOCUMENTS

EP    2807784 A1    12/2014

OTHER PUBLICATIONS

3GPP TSG RAN WG1 Meeting AH_NR#3, R1-1715394, Nagoya, Japan, Sep. 18-21, 2017.
(Continued)

*Primary Examiner* — Jamaal Henson
(74) *Attorney, Agent, or Firm* — Locke Lord LLP; Tim Tingkang Xia, Esq.

(57) ABSTRACT

A UE determines a first DCCH resource candidate in a first CORESET on a carrier, the first DCCH resource candidate including a first set of RBs. The UE also determines a first sequence of DMRSs that are mapped, starting at a reference point, to RBs in a predetermined range within the carrier in a frequency domain, the predetermined range containing the first DCCH resource candidate in the frequency domain. The UE further determines a first reference location of the first set of RBs. The UE determines, based on the first reference location, a first set of DMRSs from the first sequence of DMRSs, the first set of DMRSs being mapped to the first set of RBs. The UE obtains a channel estimation based on the first set of DMRSs; and The UE performs blind decoding of the first DCCH resource candidate based on the channel estimation.

20 Claims, 16 Drawing Sheets

Related U.S. Application Data

(60) Provisional application No. 62/587,610, filed on Nov. 17, 2017.

(51) Int. Cl.
*H04W 76/27* (2018.01)
*H04L 25/02* (2006.01)
*H04W 80/02* (2009.01)

(56) References Cited

OTHER PUBLICATIONS

3GPP TSG RAN WG1 Meeting #90, R1-1712153, Prague, Czech Republic, Aug. 21-25, 2017.
3GPP TSG RAN WG1 Meeting #90bis, R1-1717061, Prague, Czech Republic, Oct. 9-13, 2017.
China Patent Office, "Office Action", dated Nov. 28, 2022, China.
India Patent Office, "Office Action", dated Jul. 1, 2021, India.
Taiwan Patent Office, "Office Action", dated Aug. 9, 2021, Taiwan.
3GPP TSG RAN WG1 Meeting #90bis, R1-1717062, Prague, Czech Republic, Oct. 9-13, 2017.
3GPP TSG RAN WG1 Meeting #90bis, R1-1717876, Prague, Czech, Oct. 9-13, 2017.
3GPP TSG-RAN WG1 Meeting #90, R1-1714094, Prague, Czech Republic, Aug. 21-25, 2017.
European Patent Office, "Search Report", dated Feb. 9, 2023, Germany.

* cited by examiner

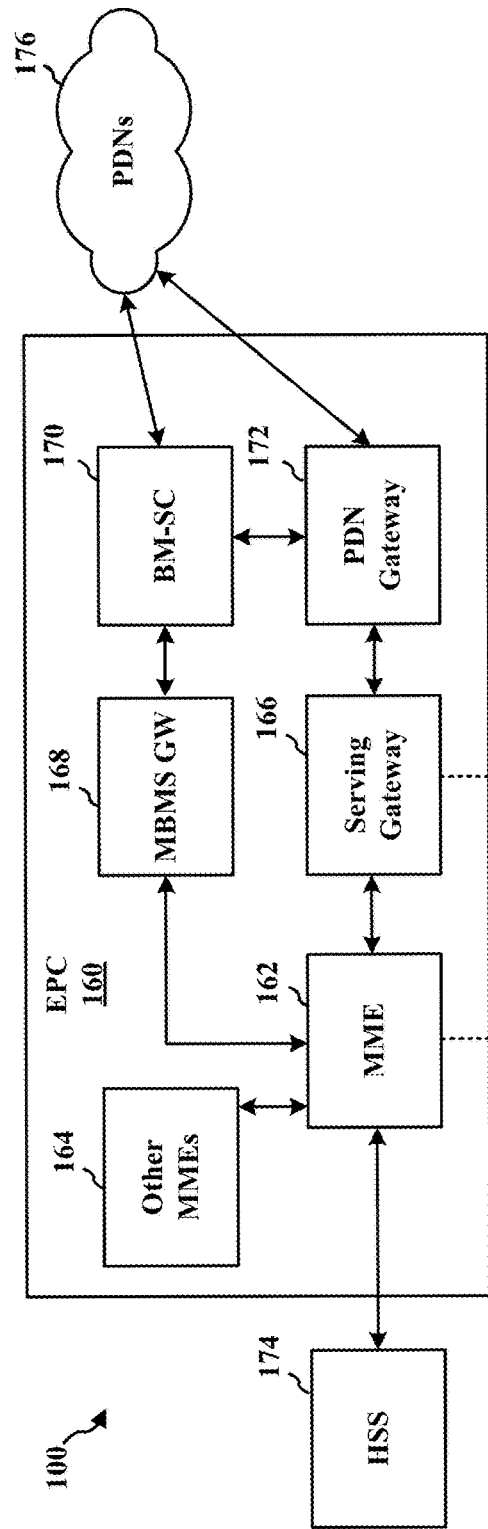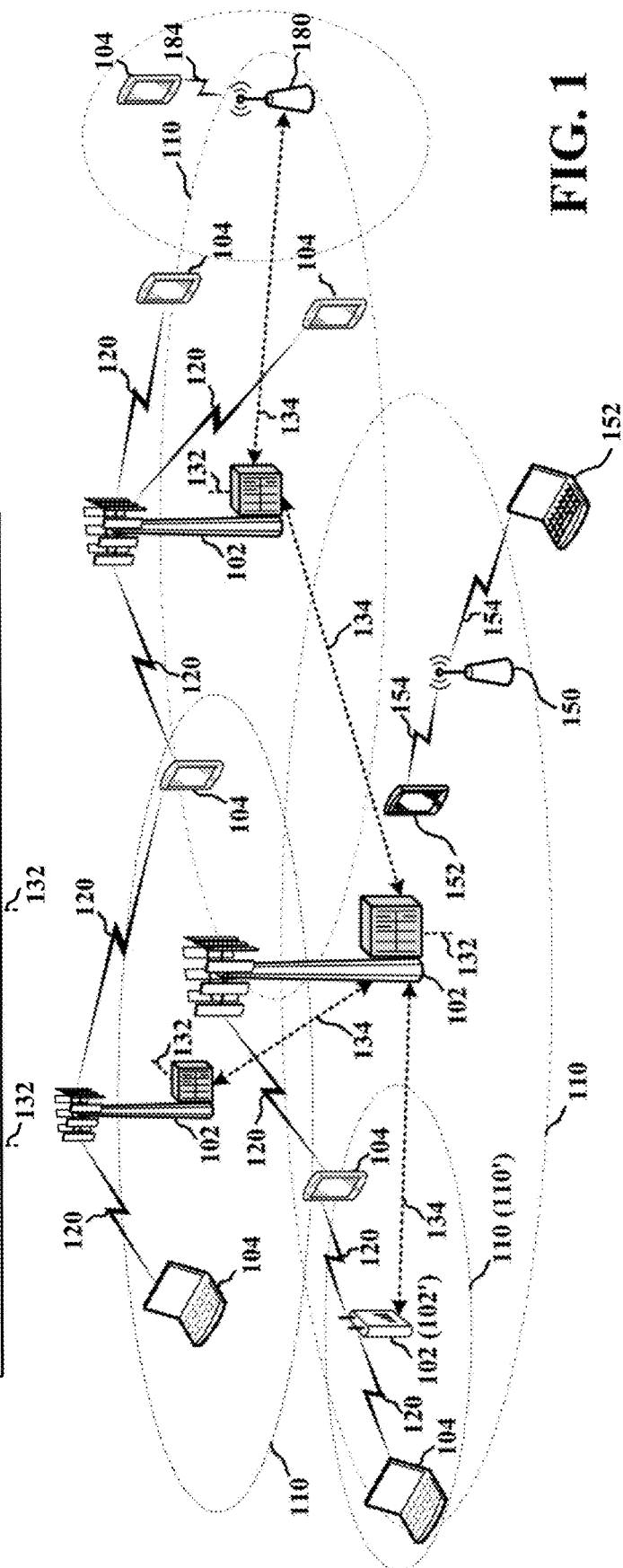
FIG. 1

PDCCH DMRS MAPPING AND CORESET RESOURCE ALLOCATION

CROSS-REFERENCE TO RELATED APPLICATION(S)

This application is a divisional application of U.S. patent application Ser. No. 16/191,640, entitled "DESIGN ON PDCCH DMRS MAPPING AND CORESET RESOURCE ALLOCATION" and filed on Nov. 15, 2018, which claims the benefit of U.S. Provisional Application Ser. No. 62/587,610, entitled "DESIGN ON THE PDCCH DMRS MAPPING AND CORESET RESOURCE ALLOCATION" and filed on Nov. 17, 2017, both of which are expressly incorporated by reference herein in their entirety.

BACKGROUND

Field

The present disclosure relates generally to communication systems, and more particularly, to techniques of determining a control resource set (CORESET) resource allocation and Demodulation Reference Signal (DMRS) mapping in the CORESET.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives a CORESET configuration of a first CORESET, the CORESET configuration indicating a reference location of the first CORESET with reference to a reference point in a frequency domain. The UE further determines resources occupied by the first CORESET in the frequency domain of a carrier based on the reference location and the reference point. The UE performs blind decoding on DCCH resource candidates in a search space carried by the first CORESET to obtain a down-link control channel.

In another aspect of the disclosure, a method, a computer-readable medium, and an apparatus are provided. The apparatus may be a UE. The UE determines a first down link control channel (DCCH) resource candidate in a first control resource set (CORESET) on a carrier, the first DCCH resource candidate including a first set of resource blocks (RBs). The UE also determines a first sequence of DMRSs that are mapped, starting at a reference point, to resource blocks (RBs) in a predetermined range within the carrier in a frequency domain, the predetermined range containing the first DCCH resource candidate in the frequency domain. The UE further determines, with reference to the reference point in the frequency domain, a first reference location of the first set of RBs. The UE determines, based on the first reference location, a first set of DMRSs from the first sequence of DMRSs, the first set of DMRSs being mapped to the first set of RBs. The UE obtains a channel estimation based on the first set of DMRSs; and The UE performs blind decoding of the first DCCH resource candidate based on the channel estimation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 1 is a diagram illustrating an example of a wireless communications system and an access network.

DETAILED DESCRIPTION

Figure 2:
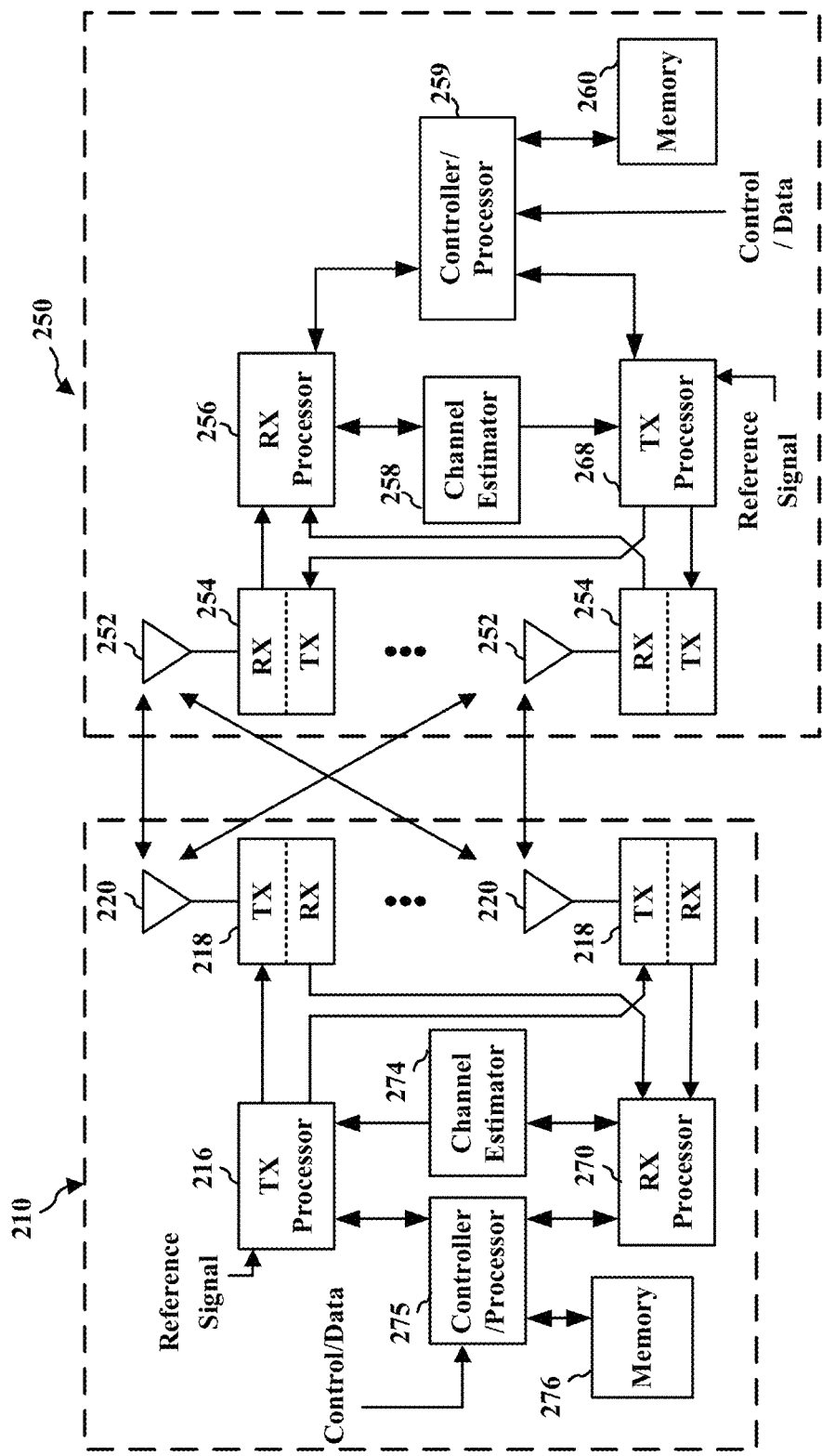
FIG. 2 is a diagram illustrating a base station in communication with a UE in an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 1 10. For example, the small cell 102' may have a coverage area 110' that overlaps the coverage area 1 10 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
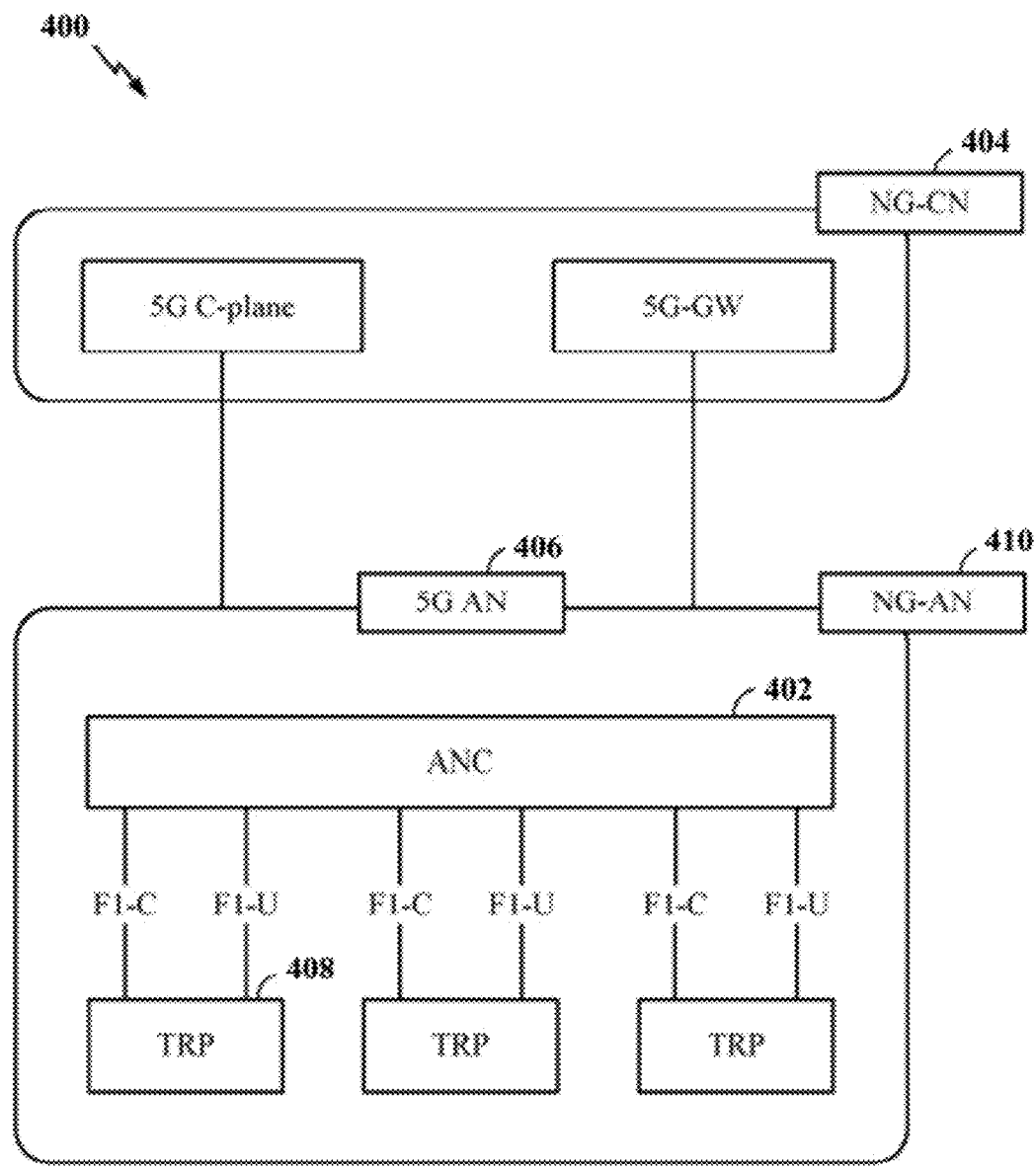
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
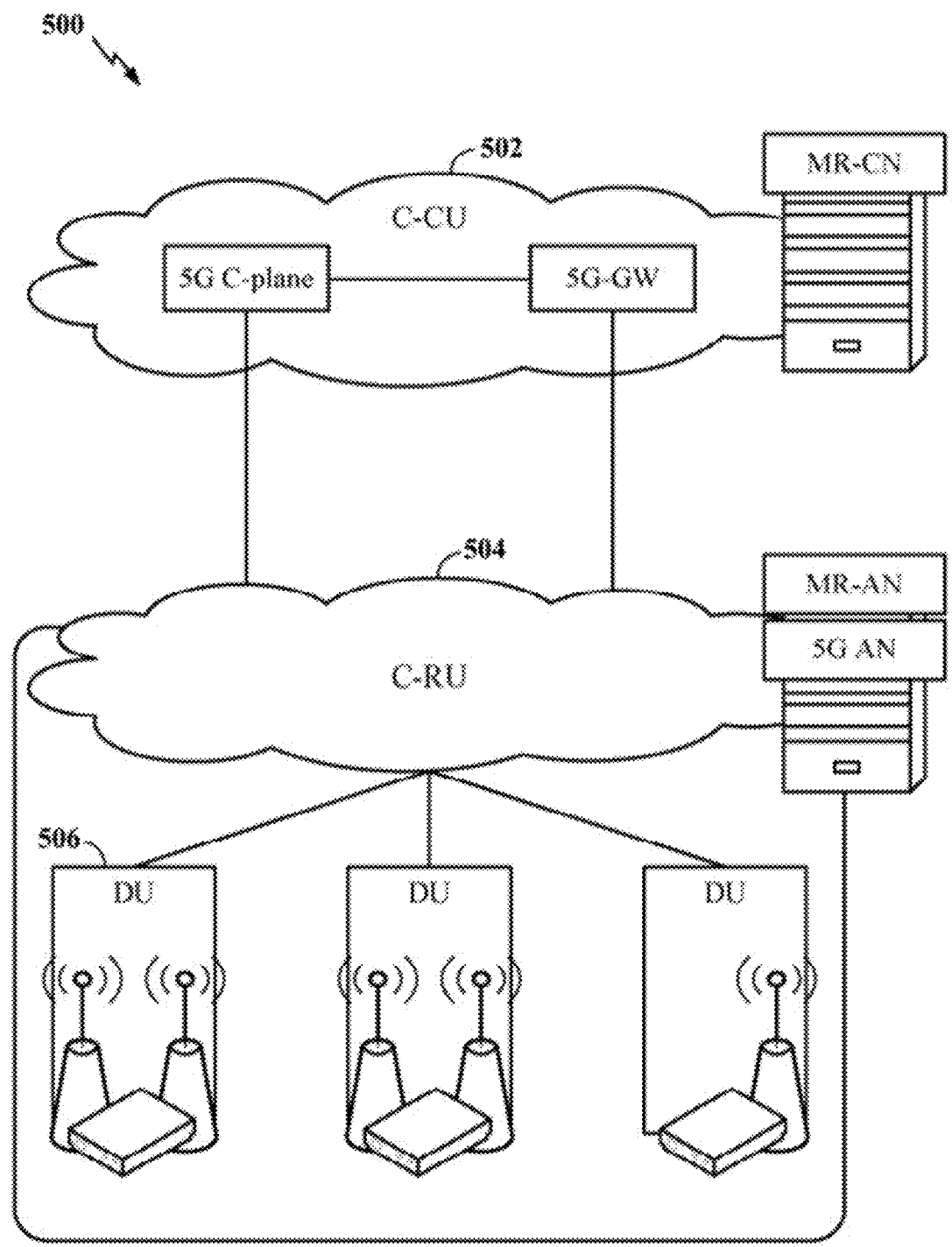
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
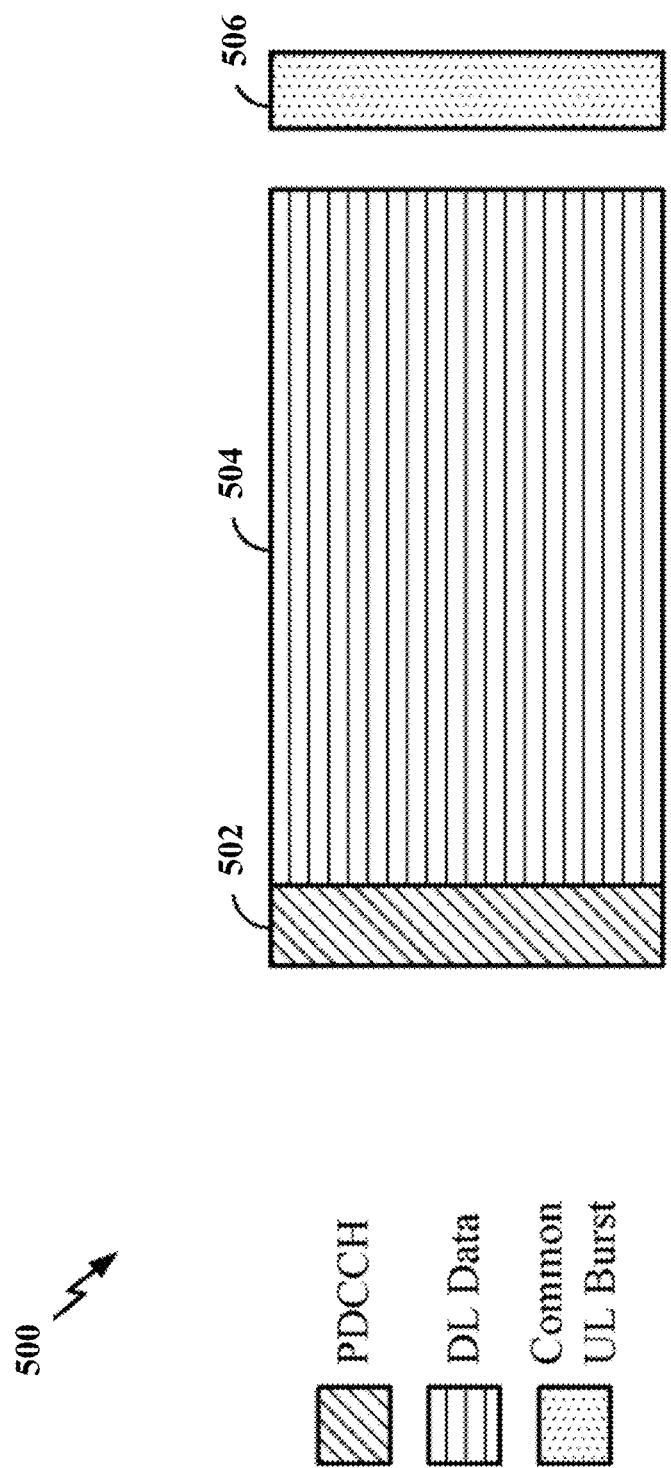
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
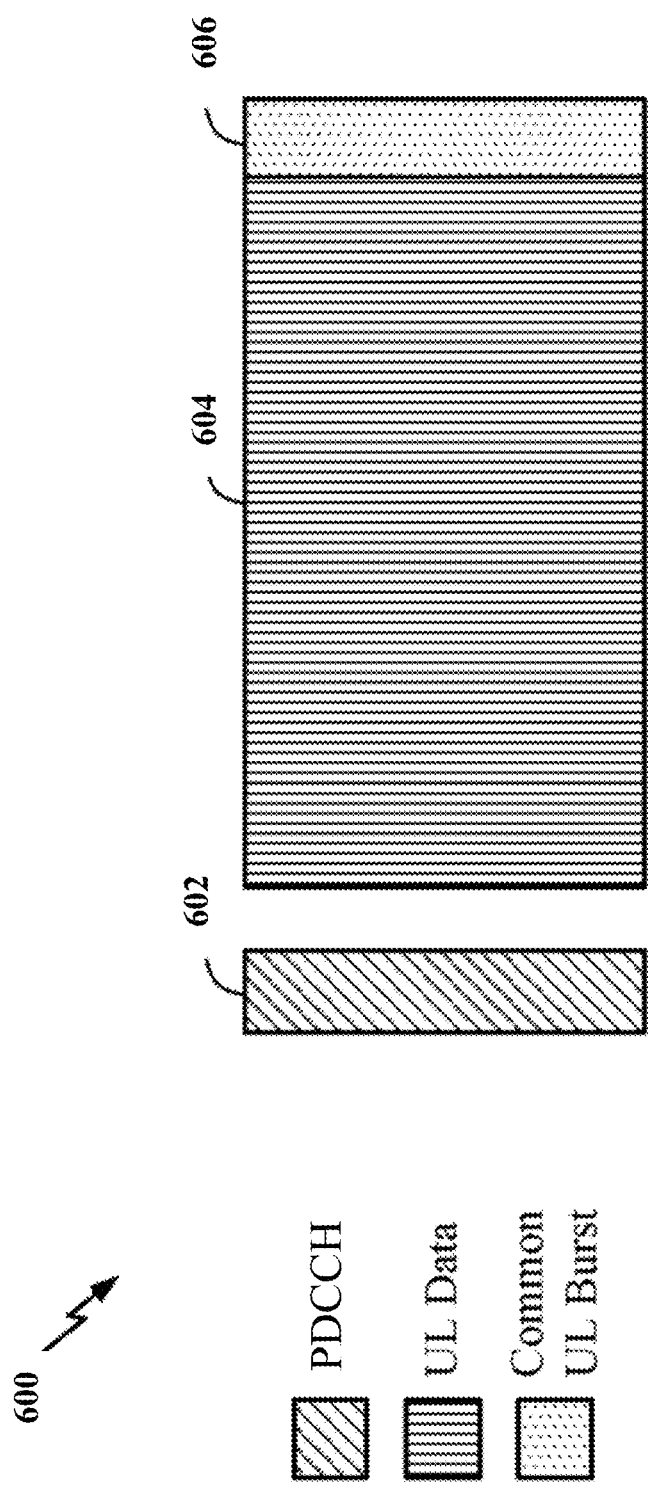
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Channel state information (CSI) reports provide the network with information about the current channel conditions. CSI usually comprises one or more pieces of information: rank indicator (RI), precoder matrix indicator (PMI), channel-quality indicator (CQI), and channel state information reference signal (CSI-RS) resource indicator (CRI).

Figure 7:
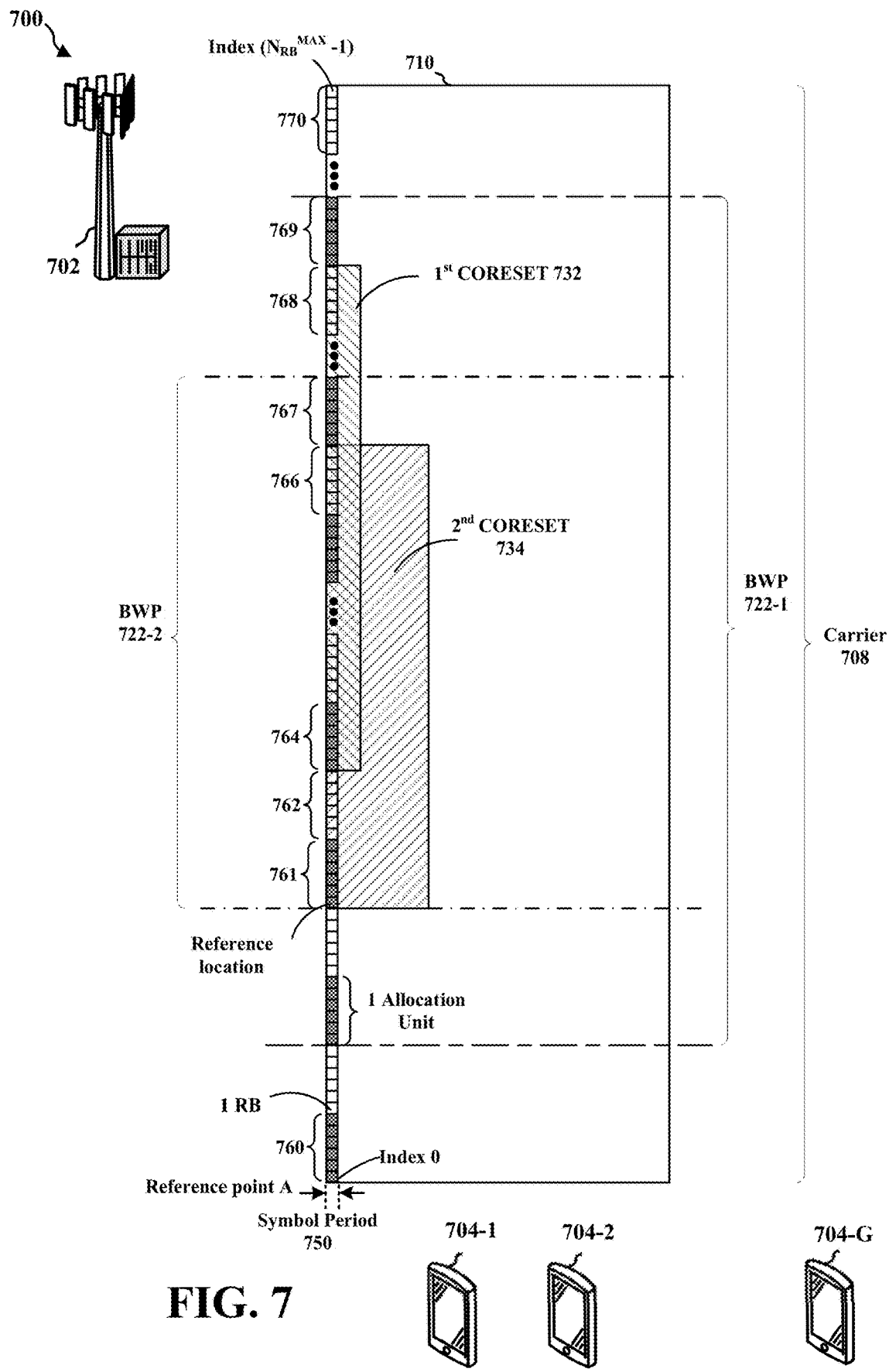
FIG. 7 is a diagram illustrating a first technique for CORESET resource allocation.

FIG. 7 is a diagram 700 illustrating communications between a base station 702 and UEs 704-1, 704-2, . . . 704-G and a first technique for CORESET resource allocation. In particular, the base station 702 communicates with the UEs 704-1, 704-2, . . . 704-G on a carrier 708 in a slot 710. The base station 702 may further assign a bandwidth part on the carrier 708 to each of the UEs 704-1, 704-2, . . . 704-G. A bandwidth part may occupy a smaller portion of or all of the bandwidth of the carrier 708. A UE communicates with the base station 702 using frequencies within the bandwidth of the assigned bandwidth part. In this example, the UE 704-1 communicates on a bandwidth part 722-1 and the UE 704-2 communicates on a bandwidth part 722-2 with the base station 702.

Further, the base station 702 may assign one or more CORESETs in the slot 710 to one or more of the UEs 704-1, 704-2, . . . 704-G. Each CORESET may be a common CORESET and, optionally, an additional CORESET in the control region 712. A common CORESET contains a common search space (CSS) and a UE-specific search space (USS). A CSS is to be accessed by one or more groups of UEs. The base station 702 can signal properties of a common CORESET to the UE 704-1 via master information block (MIB) carried by PBCH. The CSS and the USS can be fully or partially overlapped in frequency and time domains for better resource utilization. The base station 702 may not configure all of the properties of a common CORESET described infra via MIB if signaling overhead reduction is needed. Some properties, e.g., REG-to-CCE mapping, search space configurations, can be predefined and, therefore, do not need to be signaled. In addition to the USS, the UE-specific DCI can also be transmitted in the CSS of the common CORESET if there are unused resources in the CSS.

An additional CORESET contains either (a) a CSS and a USS or (b) one or more USSes only. The UE 704-1 can be configured to monitor one or more additional CORESETs via RRC signaling after C-RNTI is available. An additional CORESET can have one or more USSes. The base station 702 can configure an additional CORESET for cross-carrier scheduling in carrier scheduling with the UE 704-1. When the UE 704-1 is configured with more than one beam pair link, the UE 704-1 may receive PDCCHs corresponding to different analog beams in an additional CORESET.

In this example, the base station 702 assigns a CORESET 732 to the UE 704-1 and a CORESET 734 to the UE 704-2.

As described infra, a CORESET may be defined by multiple properties. The base station 702 can send a CORESET configuration to each of the UEs 704-1, 704-2, . . . 704-G. The CORESET configuration specifies one or more properties of a CORESET (e.g., the CORESET 732 or the CORESET 734). As described supra, the base station 702 signals the CORESET configuration specifying the properties of a common CORESET via MIB and/or a control message such as an RRC message.

In one example, the base station 702 signals a CORESET configuration specifying properties of the CORESET 732 to the UE 704-1. In particular, the CORESET configuration may indicate resources allocated to the CORESET 732 on the carrier 708 in the frequency domain and/or the time domain.

In this example, the CORESET 732 occupies one symbol period or a set of contiguous OFDM symbol periods in time domain. The CORESET configuration can indicate the starting symbol period and time duration to specify the time resource allocation of the CORESET 732.

As described infra, the base station 702 may employ several techniques to indicate frequency domain resource allocation in the CORESET configuration. In a first technique, the base station 702 indicates frequencies of the CORESET 732 based on the actual resource block (RB) indexing of the carrier 708. In a symbol period 750, there are $N_{RB}^{MAX}$ RBs spanning across the carrier 708. Each RB contains 12 subcarriers in a single symbol period. The $N_{RB}^{MAX}$ RBs are indexed from 0 to ($N_{RB}^{MAX}-1$) from the lower boundary of the frequency of the carrier 708. Further, the base station 702 allocates the frequency resources by an allocation unit that contains 6 RBs. Therefore, there are floor($N_{RB}^{MAX}/6$), which is the largest integer that is not greater than $N_{RB}^{MAX}/6$, allocation units spanning across the carrier 708 in the symbol period 750. In one configuration, in the CORESET configuration of the CORESET 732, the base station 702 may use a bitmap having floor($N_{RB}^{MAX}/6$) bits to indicate whether each of the floor($N_{RB}^{MAX}/6$) allocation units is a part of the CORESET 732. In this example, in the bitmap, bits corresponding to allocation unit 760 to allocation unit 762 as well as bits corresponding to allocation unit 769 to allocation unit 770 each have a value 0, as those allocation units are not parts of the CORESET 732. Bits corresponding to allocation unit 764 to allocation unit 768 each have a value 1, as those allocation units are a part of the CORESET 732.

As described supra, the base station 702 assigns the CORESET 734 to the UE 704-2. Accordingly, the base station 702 sends a CORESET configuration to the UE 704-2 with a bitmap having a bit corresponding to each allocation unit within the allocation unit 760 to allocation unit 770. The bits in the bitmap corresponding to the allocation unit 761 to allocation unit 766 each have a value of 1, while the other bits in the bitmap each have a value of 0.

In another configuration, instead of using a bitmap, the base station 702 may use the RB with an index 0 as a reference point, and may indicate a reference location of a lower boundary in the frequency domain of the CORESET 732. The reference location is indicated by the number of allocation units away from the reference point. In this example, the reference location of the CORESET 732 is 4, as the reference location is 4 allocation units away from the reference point. In CORESET configuration may also indicates bandwidth of the CORESET 732 by the number of allocation units assigned to the CORESET 732.

When one or more of the UEs 704-1, 704-2, . . . 704-G and the base station 702 employs this technique on the carrier 708, those UEs have the same RB grid, which is indexed from 0 to ($N_{RB}^{MAX}-1$).

By employing the first technique, each of the UEs 704-1, 704-2, . . . 704-G can determine one or more CORESETs assigned that UE. Subsequently, the UE can perform blind decoding on DCCH resource candidates in a search space carried by a CORESET to obtain a down-link control channel.

Figure 8:
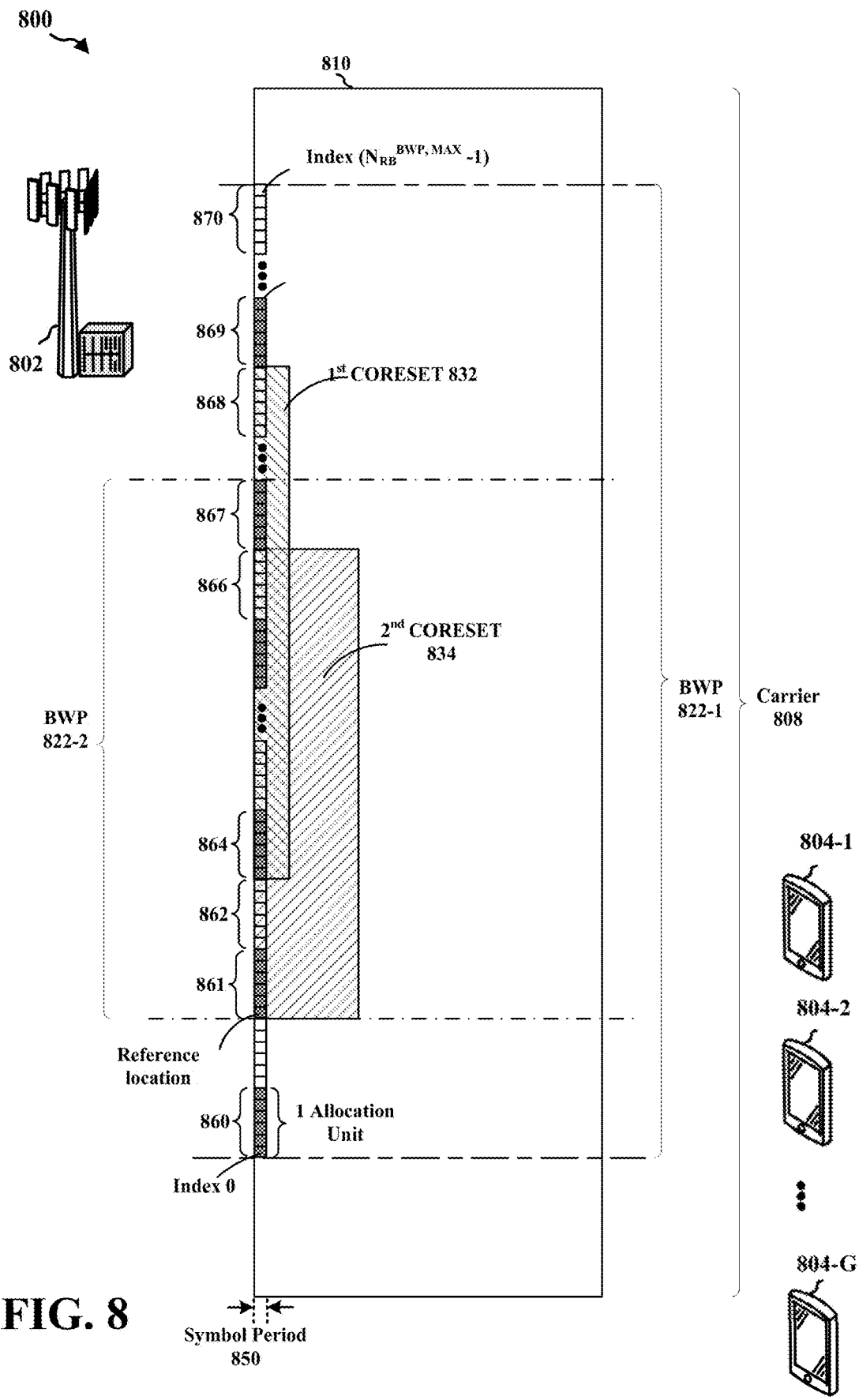
FIG. 8 is diagram illustrating a second technique for CORESET resource allocation.

FIG. 8 is a diagram 800 illustrating communications between a base station 802 and UEs 804-1, 804-2, . . . 804-G and a second technique for CORESET resource allocation. In particular, the base station 802 communicates with the UEs 804-1, 804-2, . . . 804-G on a carrier 808 in a slot 810. The base station 802 may further assign a bandwidth part on the carrier 808 to each of the UEs 804-1, 804-2, . . . 804-G. A bandwidth part may occupy a smaller portion of or all of the bandwidth of the carrier 808. A UE communicates with the base station 802 using frequencies within the bandwidth of the assigned bandwidth part. In this example, the UE 804-1 communicates on a bandwidth part 822-1 and the UE 804-2 communicates on a bandwidth part 822-2 with the base station 802.

Further, the base station 802 may assign one or more CORESETs in the slot 810 to one or more of the UEs 804-1, 804-2, . . . 804-G. In this example, the base station 802 assigns a CORESET 832 to the UE 804-1 and a CORESET 834 to the UE 804-2.

As described infra, a CORESET may be defined by multiple properties. The base station 802 can send a CORESET configuration to each of the UEs 804-1, 804-2, . . . 804-G. The CORESET configuration specifies one or more properties of a CORESET (e.g., the CORESET 832 or the CORESET 834).

In a second technique, the base station 802 signals a CORESET configuration specifying properties of the CORESET 832 to the UE 804-1. In particular, the CORESET configuration may indicate resources allocated to the CORESET 832 on the carrier 808 in the frequency domain and/or the time domain.

In this example, the CORESET 832 occupies one symbol period or a set of contiguous OFDM symbol periods in time domain. The CORESET configuration can indicate the starting symbol period and time duration to specify the time resource allocation of the CORESET 832.

As described supra, the base station 802 may employ several techniques to indicate frequency domain resource allocation in the CORESET configuration. In this second technique, the base station 802 indicates frequencies of a CORESET assigned to the UE 804-1 (i.e., the CORESET 832) based on the RB indexing of the bandwidth part assigned to the UE 804-1 (i.e., the bandwidth part 822-1).

More specifically, in a symbol period 850, there are $N_{RB}^{BWP1,MAX}$ RBs spanning across the bandwidth part 822-1. The $N_{RB}^{BWP1,MAX}$ RBs are indexed from 0 to ($N_{RB}^{BWP1,MAX}-1$) from the lower boundary of the frequency of the bandwidth part 822-1. Therefore, there are floor ($N_{RB}^{BWP1,MAX}/6$), which is the largest integer that is not greater than $N_{RB}^{BWP1,MAX}/6$, allocation units spanning across the bandwidth part 822-1 in the symbol period 850. The RB with index 0 is a reference point. In one configuration, in the CORESET configuration of the CORESET 832, the base station 802 may use a bitmap having floor ($N_{RB}^{BWP1,MAX}/6$) bits to indicate whether each of the floor ($N_{RB}^{BWP1,MAX}/6$) allocation units is a part of the CORESET 832. In this example, in the bitmap, bits corresponding to allocation unit 860 to allocation unit 862 as well as bits corresponding to allocation unit 869 to allocation unit 870 each have a value 0, as those allocation units are not parts of the CORESET 832. Bits corresponding to allocation unit 864 to allocation unit 868 each have a value 1, as those allocation units are a part of the CORESET 832.

Compared with the first technique, the second technique may have the benefit of lower signaling overhead for resource allocation configuration. By employing the second technique, each of the UEs 804-1, 804-2, . . . 804-G can determine one or more CORESETs assigned that UE. Subsequently, the UE can perform blind decoding on DCCH resource candidates in a search space carried by a CORESET to obtain a down-link control channel.

Figure 9:
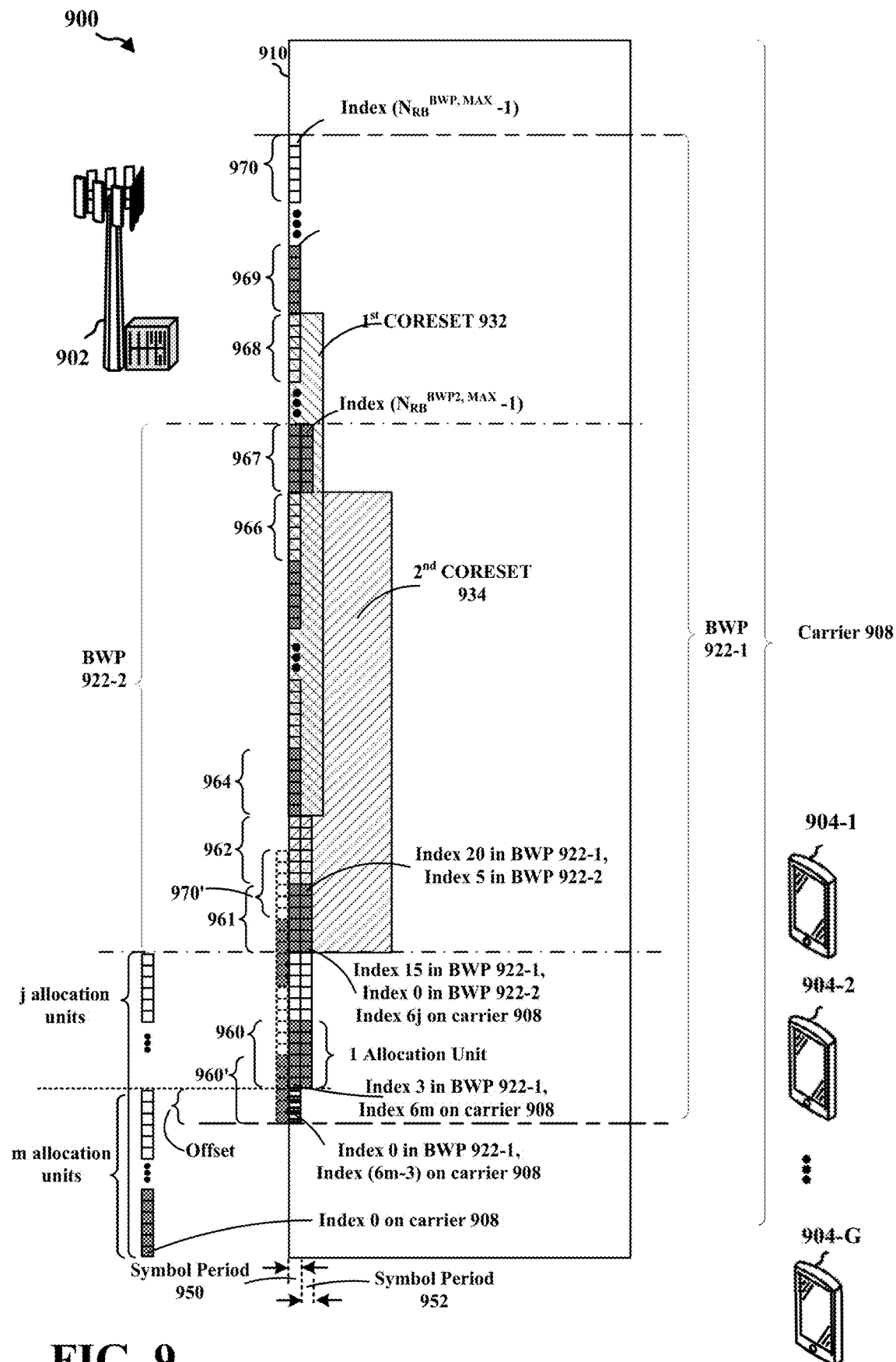
FIG. 9 is diagram illustrating a third technique for CORE-SET resource allocation.

FIG. 9 is a diagram 900 illustrating communications between a base station 902 and UEs 904-1, 904-2, . . . 904-G and a third technique for CORESET resource allocation. In particular, the base station 902 communicates with the UEs 904-1, 904-2, . . . 904-G on a carrier 908 in a slot 910. Further, the UE 904-1 communicates on a bandwidth part 922-1 and the UE 904-2 communicates on a bandwidth part 922-2 with the base station 902.

Further, the base station 902 may assign one or more CORESETs in the slot 910 to one or more of the UEs 904-1, 904-2, . . . 904-G. In this example, the base station 902 assigns a CORESET 932 to the UE 904-1 and a CORESET 934 to the UE 904-2.

As described infra, a CORESET may be defined by multiple properties. The base station 902 can send a CORESET configuration to each of the UEs 904-1, 904-2, . . . 904-G. The CORESET configuration specifies one or more properties of a CORESET (e.g., the CORESET 932 or the CORESET 934).

In a third technique, the base station 902 signals a CORESET configuration specifying properties of the CORESET 932 to the UE 904-1. In particular, the CORESET configuration may indicate resources allocated to the CORESET 932 on the carrier 908 in the frequency domain and/or the time domain.

In this example, the CORESET 932 occupies one symbol period or a set of contiguous OFDM symbol periods in time domain. The CORESET configuration can indicate the starting symbol period and time duration to specify the time resource allocation of the CORESET 932.

As described supra, the base station 902 may employ several techniques to indicate frequency domain resource allocation in the CORESET configuration. In this third technique, the base station 902 indicates frequencies of a CORESET assigned to the UE 904-1 (i.e., the CORESET 932) based on the RB indexing of the bandwidth part assigned to the UE 904-1 (i.e., the bandwidth part 922-1) with an offset.

More specifically, as shown in a symbol period 950, there are $N_{RB}^{BWP1,MAX}$ RBs spanning across the bandwidth part 922-1. The $N_{RB}^{BWP1,MAX}$ RBs are indexed from 0 to ($N_{RB}^{BWP1,MAX}-1$) from the lower boundary of the frequency of the bandwidth part 922-1. Therefore, there are floor ($N_{RB}^{BWP1,MAX}/6$) allocation units spanning across the bandwidth part 922-1 in the symbol period 950 (and other symbol periods).

Further, with respect to the bandwidth part 922-2, as shown in a symbol period 952, there are $N_{RB}^{BWP2,MAX}$ RBs spanning across the bandwidth part 922-2. The $N_{RB}^{BWP1,MAX}$ RBs are indexed from 0 to ($N_{RB}^{BWP2,MAX}-1$)

from the lower boundary of the frequency of the bandwidth part 922-2. Therefore, there are floor($N_{RB}^{BWP2,MAX}$/6), which is the largest integer that is not greater than $N_{RB}^{BWP2,MAX}$/6, allocation units spanning across the bandwidth part 922-2 in the symbol period 952 (and other symbol periods).

In accordance with the second technique, the base station 902 may assign allocation units for the CORESET 932 of the UE 904-1 starting from the RB with index 0 in the bandwidth part 922-1. Therefore, an initial allocation unit 960' contains RBs with indices 0-5 in the bandwidth part 922-1. Similarly, the base station 902 may assign allocation units for the CORESET 934 of the UE 904-2 starting from the RB with index 0 in the bandwidth part 922-2. Therefore, an initial allocation unit 961 contains RBs with indices 0-5 in the bandwidth part 922-2. In this example, the RB with an index of 0 in the bandwidth part 922-2 has an index of 15 in the bandwidth part 922-1.

In this example, in accordance with the second technique, the allocation units assigned in the bandwidth part 922-1 by the base station 902 is not assigned with the allocation units assigned in the bandwidth part 922-2. That is, the boundaries of the allocation units in the bandwidth part 922-1 are not the same as the boundaries of the allocation units in the bandwidth part 922-2. As such, an allocation unit 970' of the CORESET 932 overlaps with both allocation unit 961 and allocation unit 962 of the CORESET 934. In other words, transmission in RBs of one allocation unit of the CORESET 932 may block or interfere with transmission in RBs of two allocation units of the CORESET 934.

In this third technique, the base station 902 determines an offset of the lower boundary of the bandwidth part 922-1 with the RB (i.e., the RB with index 6m on the carrier 908) that is m allocation units of RBs away from lower boundary of the carrier 908 (i.e., the RB with index 0 on the carrier 908). m is the smallest integer such that the index on the carrier 908 assigned to the RB with index 0 in the bandwidth part 922-1 is 6m or is smaller than 6m. The offset may be from 0 RB to 5 RBs. In this example, the RB with index 0 in the bandwidth part 922-1 has an index (6m−3) on the carrier 908. Therefore, the offset associated with the bandwidth part 922-1 is 3 RBs. The base station 902 adds the offset to the index of the starting RB of an initial allocation unit 960 of the bandwidth part 922-1. That is, according to the third technique, in this example, the initial allocation unit 960 starts at the RB with an index of 3, comparing to starting at the RB with an index of 0 in accordance with the second technique; the base station 902 assigns allocation units for RBs with indices 3 to $N_{RB}^{BWP2,MAX}$.

Similarly, the base station 902 determines an offset of the lower boundary of the bandwidth part 922-2 with the RB with an index 6j on the carrier 908. j is the smallest integer such that the index on the carrier 908 assigned to the RB with index 0 in the bandwidth part 922-2 is 6j or smaller than 6j. In this example, the RB with index 0 in the bandwidth part 922-2 has an index 6j on the carrier 908. Therefore, the offset associated with the bandwidth part 922-2 is 0 RB. Accordingly, the base station 902 assigns allocation units in the bandwidth part 922-2 in accordance with the second technique.

As such, the allocation units assigned in the bandwidth part 922-1 are aligned with the allocation units assigned in the bandwidth part 922-2.

In one configuration, in the CORESET configuration of the CORESET 932, the base station 902 may use a bitmap having floor(($N_{RB}^{BWP1,MAX}$−offset)/6) bits to indicate whether each of the floor(($N_{RB}^{BWP1,MAX}$−offset)/6) allocation units is a part of the CORESET 932. In this example, in the bitmap, bits corresponding to allocation unit 960 to allocation unit 962 as well as bits corresponding to allocation unit 969 to allocation unit 970 each have a value 0, as those allocation units are not parts of the CORESET 932. Bits corresponding to allocation unit 964 to allocation unit 968 each have a value 1, as those allocation units are a part of the CORESET 932.

As described supra, the granularities for a bandwidth parts and a CORESETs are 1 RB and 6 RBs, respectively. The bandwidth part 922-1 and the bandwidth part 922-2 are allocated in the same carrier 908 and configured to the UE 904-1 and the UE 904-2, respectively. The bandwidth part 922-1 and the bandwidth part 922-2 are partially overlapped and the CORESET 932 and the CORESET 934 are partially overlapped in physical resources as well.

In the second technique, the frequency bandwidth and the starting RB of a bandwidth part in a carrier is not restricted. Therefore, the RB grids with allocation units of CORESETs in different bandwidth parts may not be aligned. As such, a PDCCH candidate in one CORESET may block more than one PDCCH candidates in the other CORESET, if their search spaces are partially overlapped.

Employing the third technique may reduce the blocking rate. An offset with granularity 1 RB can be applied to determine the starting RB indexing of the CORESETs such that the allocation units of different CORESETs are aligned. The offset can be signaled to UE through the higher-layer signaling with the resource allocation of CORESET.

By employing the third technique, each of the UEs 904-1, 904-2, . . . 904-G can determine one or more CORESETs assigned that UE. Subsequently, the UE can perform blind decoding on DCCH resource candidates in a search space carried by a CORESET to obtain a down-link control channel.

Figure 10:
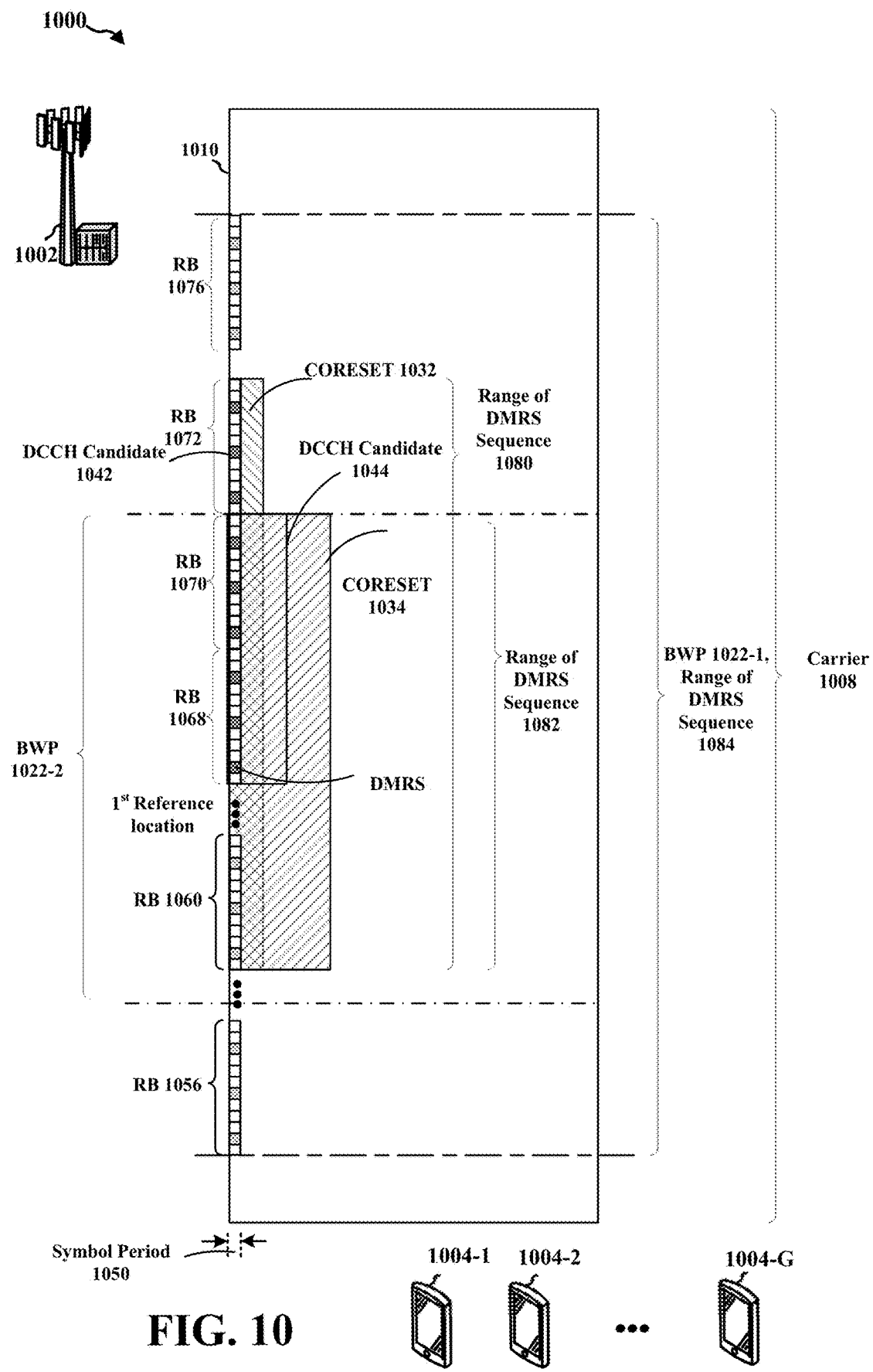
FIG. 10 is a diagram illustrating first and second options for DMRS mapping.

FIG. 10 is a diagram 1000 illustrating communications between a base station 1002 and UEs 1004-1, 1004-2, . . . 1004-G and first and second options for DMRS mapping. In particular, the base station 1002 communicates with the UEs 1004-1, 1004-2, . . . 1004-G on a carrier 1008 in a slot 1010. Further, the UE 1004-1 communicates on a bandwidth part 1022-1 and the UE 1004-2 communicates on a bandwidth part 1022-2 with the base station 1002.

Further, the base station 1002 may assign one or more CORESETs in the slot 1010 to one or more of the UEs 1004-1, 1004-2, . . . 1004-G. In this example, the base station 1002 assigns a CORESET 1032 and a CORESET 1034 to the UE 1004-1.

As described infra, a CORESET may be defined by multiple properties. The base station 1002 can send a CORESET configuration to each of the UEs 1004-1, 1004-2, . . . 1004-G. The CORESET configuration specifies one or more properties of a CORESET (e.g., the CORESET 1032 or the CORESET 1034).

The base station 1002 signals a CORESET configuration specifying properties of the CORESET 1032 to the UE 1004-1. In particular, the CORESET configuration may indicate resources allocated to the CORESET 1032 on the carrier 1008 in the frequency domain and/or the time domain.

After determines the resource allocation of the CORESET 1032, the UE 1004-1 further determines a DMRS mapping in the CORESET 1032. In this first option, the base station 1002 and the UE 1004-1 agrees to use a reference point that is specific and relevant to the CORESET 1032 to map a DMRS sequence 1080. Within a symbol period 1050, the CORESET 1032 ranges in frequency domain from an RB 1060 having the lowest frequency to an RB 1072 having the highest frequency. In one example, the reference point is the RB 1060. Further, an RB contains 12 resource elements indexed from 0 to 11 on 12 subcarriers in a symbol period. In this example, resource elements with indices 1, 5, and 9 in each RB of a DCCH resource candidate are mapped with DMRSs.

In this option, the base station 1002 generates the DMRS sequence 1080 that can be mapped from the RB 1060 to the RB 1072. But only if an RB in the CORESET is actually a part of a DCCH resource candidate, that RB will actually carry a DMRS from the sequence mapped to that RB.

In this example, the base station 1002 configures a PDCCH resource candidate 1042 including the RBs 1068, 1070, 1072 in a symbol period 1050. On the other hand, the RB 1060 is not a part of any DCCH resource candidate. Therefore, although the base station 1002 generates the DMRS sequence 1080 whose initial 3 DMRSs are mapped to the RB 1060, the base station 1002 does not actually use the resource elements with indices 1, 5, and 9 in the RB 1060 to carry those 3 DMRSs. The DMRS sequence 1080 also contains 9 DMRSs mapped to the RBs 1068, 1070, 1072. As the RBs 1068, 1070, 1072 are a part of the PDCCH resource candidate 1042, the base station 1002 actually use the resource elements with indices 1, 5, and 9 in the RBs 1068, 1070, 1072 to carry those 9 DMRSs.

Further, the base station 1002 configures a PDCCH resource candidate 1042 including the RBs 1068, 1070, 1072 in a symbol period 1050. On the other hand, the RB 1060 is not a part of any DCCH resource candidate. Therefore, although the base station 1002 generates the DMRS sequence 1080 whose initial 3 DMRSs are mapped to the RB 1060, the base station 1002 does not actually use the resource elements with indices 1, 5, and 9 in the RB 1060 to carry those 3 DMRSs. The DMRS sequence 1080 also contains 9 DMRSs mapped to the RBs 1068, 1070, 1072. As the RBs 1068, 1070, 1072 are a part of the PDCCH resource candidate 1042, the base station 1002 actually use the resource elements with indices 1, 5, and 9 in the RBs 1068, 1070, 1072 to carry those 9 DMRSs.

Correspondingly, after determining the resources of the CORESET 1032, the UE 1004-1 generates the DMRS sequence 1080 that can be mapped from the RB 1060 to the RB 1072. The UE 1004-1 further determines the RBs 1068, 1070, 1072 in the symbol period 1050 are a part of the PDCCH resource candidate 1042. Accordingly, the UE 1004-1 measures the signals carried by the resource elements with indices 1, 5, and 9 in the RBs 1068, 1070, 1072. The UE 1004-1 further performs a channel estimation based on the measured signals in those resource elements and the 9 DMRSs from the DMRS sequence 1080 mapped to those resource elements.

Similarly, the base station 1002 and the UE 1004-1 agrees to use a reference point that is specific and relevant to the CORESET 1034 to map a DMRS sequence 1082. Within a symbol period 1050, the CORESET 1034 ranges in frequency domain from an RB 1060 having the lowest frequency to an RB 1070 having the highest frequency. In one example, the reference point is the RB 1060.

In this example, the base station 1002 configures a PDCCH resource candidate 1044 of the CORESET 1034 including the RBs 1068, 1070 in the symbol period 1050. Accordingly, the base station 1002 use the resource elements with indices 1, 5, and 9 in the RBs 1068, 1070 to carry those 6 DMRSs in the DMRS sequence 1082 mapped to those RBs.

Correspondingly, after determining the resources of the CORESET 1034, the UE 1004-1 generates the DMRS sequence 1082 that can be mapped from the RB 1060 to the RB 1070. The UE 1004-1 further determines the RBs 1068, 1070 in the symbol period 1050 are a part of the PDCCH resource candidate 1044. Accordingly, the UE 1004-1 measures the signals carried by the resource elements with indices 1, 5, and 9 in the RBs 1068, 1070. The UE 1004-1 further performs a channel estimation based on the measured signals in those resource elements and the 6 DMRSs from the DMRS sequence 1082 mapped to those resource elements.

The UE complexity in channel estimation process may be higher in this example. The CORESET 1032 and the CORESET 1034 are assigned to the same UE and are partially overlapped in the physical resources. The PDCCH resource candidate 1042 of the CORESET 1032 and the PDCCH resource candidate 1044 of the CORESET 1034 both include the RBs 1068, 1070. As described supra, the UE 1004-1 performs DMRS extraction in channel estimation process for the RBs 1068, 1070 twice, as the DMRSs accompanied with the DCCH resource candidates of different CORESETs have different reference points.

In a second option, the base station 1002 and the UE 1004-1 agrees to use a reference point that is specific and relevant to the bandwidth part 1022-1 to map a DMRS sequence 1084. Within a symbol period 1050, the bandwidth part 1022-1 ranges in frequency domain from an RB 1056 having the lowest frequency to an RB 1076 having the highest frequency. In one example, the reference point is the RB 1056. In particular, this option may be employed when the base station 1002 signals the CORESET configuration for the CORESET 1032 and the CORESET configuration for the CORESET 1034 through MIB or remaining minimum system information (RMSI). During the initial access, the bandwidth part 1022-1, which is the initial active bandwidth part, is defined as frequency location and bandwidth of RMSI CORESET. At the same time, the UE 1004-1 has no knowledge of the RB indexing of the initial BWP within the carrier 1008. In general, the initial active down-link bandwidth part may be defined as frequency location and bandwidth of RMSI CORESET and numerology of RMSI. PDSCH delivering RMSI are confined within the initial active down-link bandwidth part.

DMRSs from the DMRS sequence 1084 are mapped to both the PDCCH resource candidate 1042 of the CORESET 1032 and the PDCCH resource candidate 1044 of the CORESET 1034. Therefore, the RBs 1068, 1070 carry the same DMRSs for both the PDCCH resource candidate 1042 and the PDCCH resource candidate 1044. Accordingly, the UE 1004-1 generates the DMRS sequence 1084 that can be mapped from the RB 1056 to the RB 1076. The UE 1004-1 further determines the RBs 1068, 1070 in the symbol period 1050 are a part of the PDCCH resource candidate 1042 and the PDCCH resource candidate 1044. Accordingly, the UE 1004-1 measures the signals carried by the resource elements with indices 1, 5, and 9 in the RBs 1068, 1070. The UE 1004-1 further performs a channel estimation based on the measured signals in those resource elements and the 6 DMRSs from the DMRS sequence 1082 mapped to those resource elements. The results of the channel estimation can be used in blind decoding of both the PDCCH resource candidate 1042 and the PDCCH resource candidate 1044.

As described supra, the bandwidth part 1022-1 and the bandwidth part 1022-2 are configured to the UE 1004-1 and the UE 1004-2, respectively. And the CORESETs of two UEs may be partially overlapped. In the second option, the reference points of DMRS mapping for the UE 1004-1 and the UE 1004-2 are starting point of the bandwidth part 1022-1 and the bandwidth part 1022-2, respectively. With this option, the overlapped region of the CORESETs may not be used to transmit the (group) common PDCCH intended to both the UE 1004-1 and the UE 1004-2, as the DMRSs in the overlapping region for the two UEs are different. From the perspective of network, this may restrict the scheduling flexibility. And the signaling overhead of (group) common information is increased. Further, the UE 1004-1 does not know the reference point of the DMRS mapping of the UE 1004-2, as the reference point is BWP-specific. Hence, each of the UE 1004-1 and the UE 1004-2 may not be able to perform DMRS interference cancellation.

Figure 11:
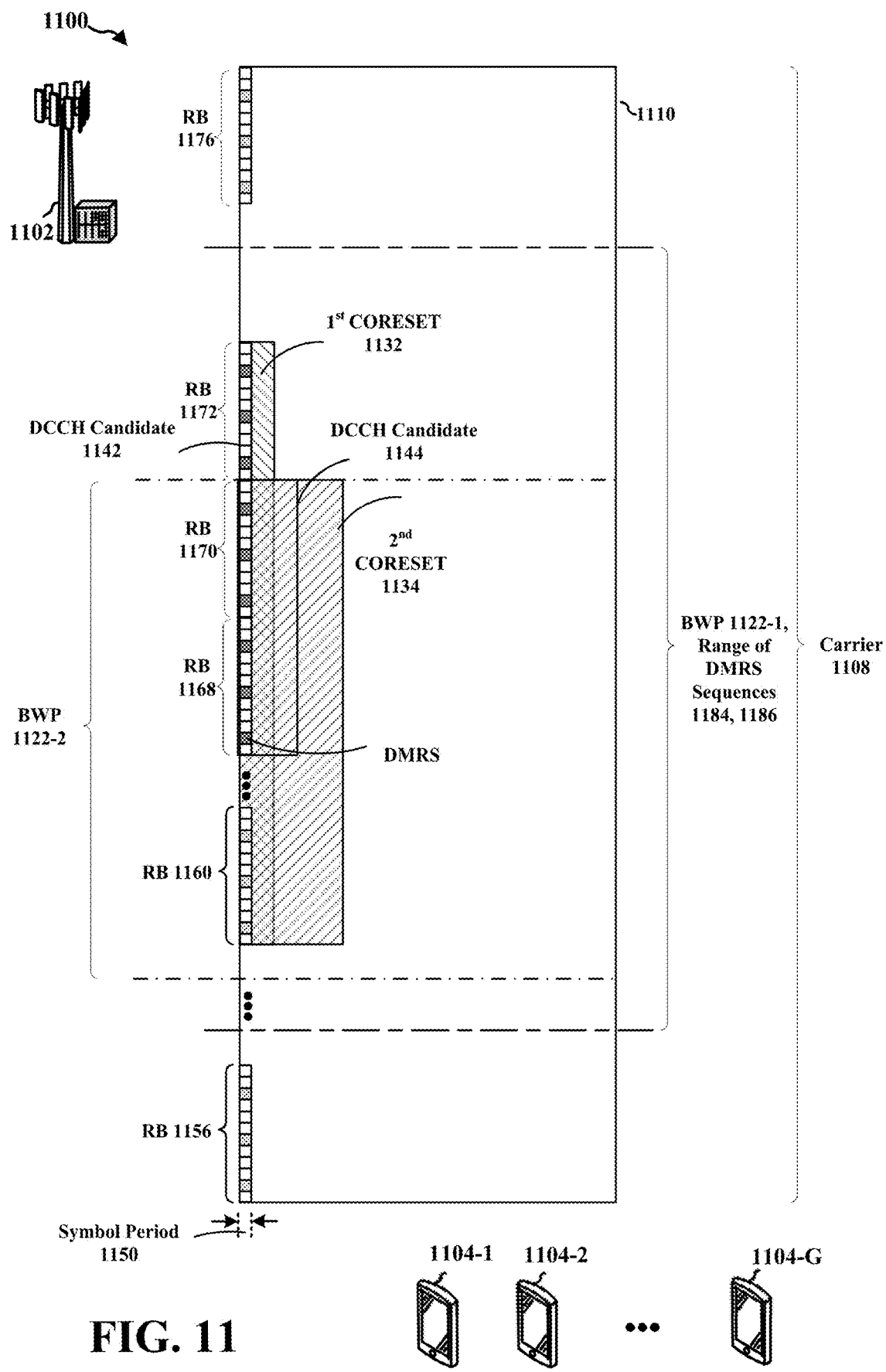
FIG. 11 is a diagram illustrating a third option for DMRS mapping.

FIG. 11 is a diagram 1100 illustrating communications between a base station 1102 and UEs 1104-1, 1104-2, . . . 1104-G and a third option for DMRS mapping. In particular, the base station 1102 communicates with the UEs 1104-1, 1104-2, . . . 1104-G on a carrier 1108 in a slot 1110. Further, the UE 1104-1 communicates on a bandwidth part 1122-1 and the UE 1104-2 communicates on a bandwidth part 1122-2 with the base station 1102.

Further, the base station 1102 may assign one or more CORESETs in the slot 1110 to one or more of the UEs 1104-1, 1104-2, . . . 1104-G. In this example, the base station 1102 assigns a CORESET 1132 to the UE 1104-1 and a CORESET 1134 to the UE 1104-2.

As described infra, a CORESET may be defined by multiple properties. The base station 1102 can send a CORESET configuration to each of the UEs 1104-1, 1104-2, . . . 1104-G. The CORESET configuration specifies one or more properties of a CORESET (e.g., the CORESET 1132 or the CORESET 1134).

The base station 1102 signals a CORESET configuration specifying properties of the CORESET 1132 to the UE 1104-1. In particular, the CORESET configuration may indicate resources allocated to the CORESET 1132 on the carrier 1108 in the frequency domain and/or the time domain.

After determines the resource allocation of the CORESET 1132, the UE 1104-1 further determines a DMRS mapping in the CORESET 1132.

In a third option, the base station 1102 and the UE 1104-1 agrees to use a reference point that is specific and relevant to the carrier 1108 to map a DMRS sequence 1184. Within a symbol period 1150, the carrier 1108 ranges in frequency domain from an RB 1156 having the lowest frequency to an RB 1176 having the highest frequency. In one example, the reference point is the RB 1156. In particular, this option may be employed when the base station 1102 signals the CORESET configuration for the CORESET 1132 and the CORESET configuration for the CORESET 1134 through UE-specific Radio Resource Control (RRC) signaling. The actual RB indexing of the carrier 1108 is provided to the UEs 1104-1, 1104-2, . . . 1104-G through the higher layer configurations. The offset from a common reference point RB with index 0 to the lowest RB of the SS block accessed by a UE is configured to the UE at least in RRC connected mode. The UE can deduce the RB indexing of the carrier 1108 based on the offset. The RB indexing is the same for all UEs 1104-1, 1104-2, . . . 1104-G within the carrier 1108. In this option, the common reference point RB with index 0 can be reused as the reference point of DMRS mapping.

In the third option, the reference point for starting mapping a DMRS sequence may be the RB with index 0 in the carrier. The reference point may be common to all the UEs sharing a wideband component carrier from the network perspective, regardless of whether they are narrow band, carrier aggregation, or wideband UEs.

In this example, the base station 1102 configures a PDCCH resource candidate 1142 including the RBs 1168, 1170, 1172 in a symbol period 1150. The DMRS sequence 1184 contains 9 DMRSs mapped to the RBs 1168, 1170, 1172. As the RBs 1168, 1170, 1172 are a part of the PDCCH resource candidate 1142, the base station 1102 use the resource elements with indices 1, 5, and 9 in the RBs 1168, 1170, 1172 to carry those 9 DMRSs.

Further, the base station 1102 and the UE 1104-2 agrees to use a reference point that is specific and relevant to the carrier 1108 to map a DMRS sequence 1186. In one example, the reference point is the RB 1156. The base station 1102 configures a PDCCH resource candidate 1144 including the RBs 1168, 1170 in the symbol period 1150. The DMRS sequence 1186 contains 2 DMRSs mapped to the RBs 1168, 1170. As the RBs 1168, 1170 are a part of the PDCCH resource candidate 1144, the base station 1102 use the resource elements with indices 1, 5, and 9 in the RBs 1168, 1170 to carry those 6 DMRSs.

DMRSs from the DMRS sequence 1184 are mapped to the PDCCH resource candidate 1142 of the CORESET 1132. DMRSs from the DMRS sequence 1186 are mapped to the PDCCH resource candidate 1144 of the CORESET 1134. Therefore, the RBs 1168, 1170, which belongs to the PDCCH resource candidate 1142 and the PDCCH resource candidate 1144, carry the DMRSs for both the PDCCH resource candidate 1142 and the PDCCH resource candidate 1144. The UE 1104-1 generates the DMRS sequence 1184 that can be mapped from the RB 1156 to the RB 1176. The UE 1104-1 further determines the RBs 1168, 1170, 1172 in the symbol period 1150 are a part of the PDCCH resource candidate 1142. The UE 1104-1 measures the signals carried by the resource elements with indices 1, 5, and 9 in the RBs 1168, 1170, 1172. Further, the UE 1104-1 may also have knowledge of the CORESET 1134 and the PDCCH resource candidate 1144 as well as the DMRS sequence 1186. Therefore, the UE 1104-1 may determine the DMRSs from the DMRS sequence 1186 that are mapped to the RBs 1168, 1170.

As such, the UE 1104-1 can perform a channel estimation based on the measured signals in the RBs 1168, 1170, 1172 and the 9 DMRSs from the DMRS sequence 1184 mapped to the RBs 1168, 1170, 1172. Further, the UE 1104-1 can determine the DMRSs from the DMRS sequence 1186 mapped to the RBs 1168, 1170. The UE 1104-1 can apply interference cancellation based on 6 DMRSs mapped to the RBs 1168, 1170. The results of the channel estimation can be used in blind decoding of the PDCCH resource candidate 1142.

In certain configurations, each of the DMRS sequence 1080, the DMRS sequence 1082, the DMRS sequence 1084, the DMRS sequence 1184, and the DMRS sequence 1186 may be generated using the Gold sequence.

In certain configurations, DMRSs may be carried in resource elements other than those with indices 1, 5, and 9 in an RB. For example, DMRSs may be carried in resource elements with indices 2, 6, 10 in an RB.

Figure 12:
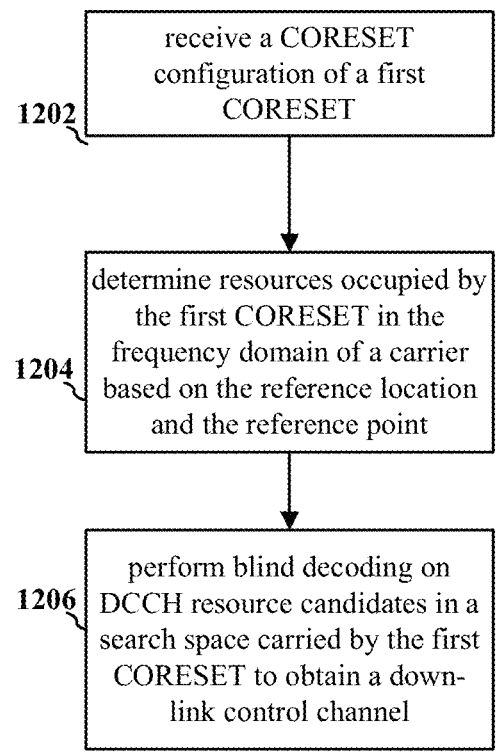
FIG. 12 is a flow chart of a method (process) for determining a CORESET and perform blind decoding on the CORESET.

FIG. 12 is a flow chart 1200 of a method (process) for determining a CORESET and perform blind decoding on the CORESET. The method may be performed by a UE (e.g., the UEs 704-1, 704-2, . . . 704-G, the UEs 804-1, 804-2, . . . 804-G, the UEs 904-1, 904-2, . . . 904-G, the apparatus 1502, and the apparatus 1502').

At operation 1202, the UE receives a CORESET configuration of a first CORESET (e.g., the CORESET 732) on a carrier (e.g., the carrier 708). The CORESET configuration indicates a reference location (e.g., the bitmap in the first technique referring to FIG. 7) of the first CORESET with reference to a reference point (e.g., the allocation unit 760) in a frequency domain. At operation 1204, the UE determines resources occupied by the first CORESET (e.g., the allocation unit 764 to the allocation unit 768) in the frequency domain of the carrier based on the reference location and the reference point. At operation 1206, the UE performs blind decoding on DCCH resource candidates in a search space carried by the first CORESET to obtain a down-link control channel.

In certain configurations, the reference location is indicated by an integer of allocation units away from the reference point, each of the allocation units including N resource blocks (RBs), N being an integer greater than 0. In certain configurations, N is 6.

In certain configurations, the reference location is indicated by indications (e.g., the bitmap in the first technique referring to FIG. 7) of whether each resource block (RB) in the carrier or a bandwidth part of the carrier constitutes the first CORESET. In certain configurations, the CORESET configuration is received through a system information transmission. In certain configurations, the CORESET configuration is received through a Radio Resource Control (RRC) signaling specific to the UE.

In certain configurations, the reference point is a predetermined point (e.g., the allocation unit 760) of the carrier in the frequency domain.

In certain configurations, the reference point is a predetermined point (e.g., the allocation unit 860) of a bandwidth part (e.g., the bandwidth part 822-1) of the carrier assigned to the UE in the frequency domain.

In certain configurations, the reference point is a point (e.g., the allocation unit 960) at an offset (e.g., 3 RBs) from a predetermined point (e.g., RB with index 0) of a bandwidth part (e.g., the bandwidth part 922-1) of the carrier assigned to the UE in the frequency domain. In certain configurations, the predetermined point is a starting point of the bandwidth part (e.g., the bandwidth part 922-1). In certain configurations, the reference location is indicated by an integer of allocation units away from the reference point, each of the allocation units including N resource blocks (RBs), N being an integer greater than 0. In certain configurations, the offset is an integer selected from 0 to (N−1) such that a starting point of a second CORESET (e.g., the CORESET 934) is at an integer of allocation units away from the reference point, the second CORESET overlapping with the first CORESET (e.g., the CORESET 932).

Figure 13:
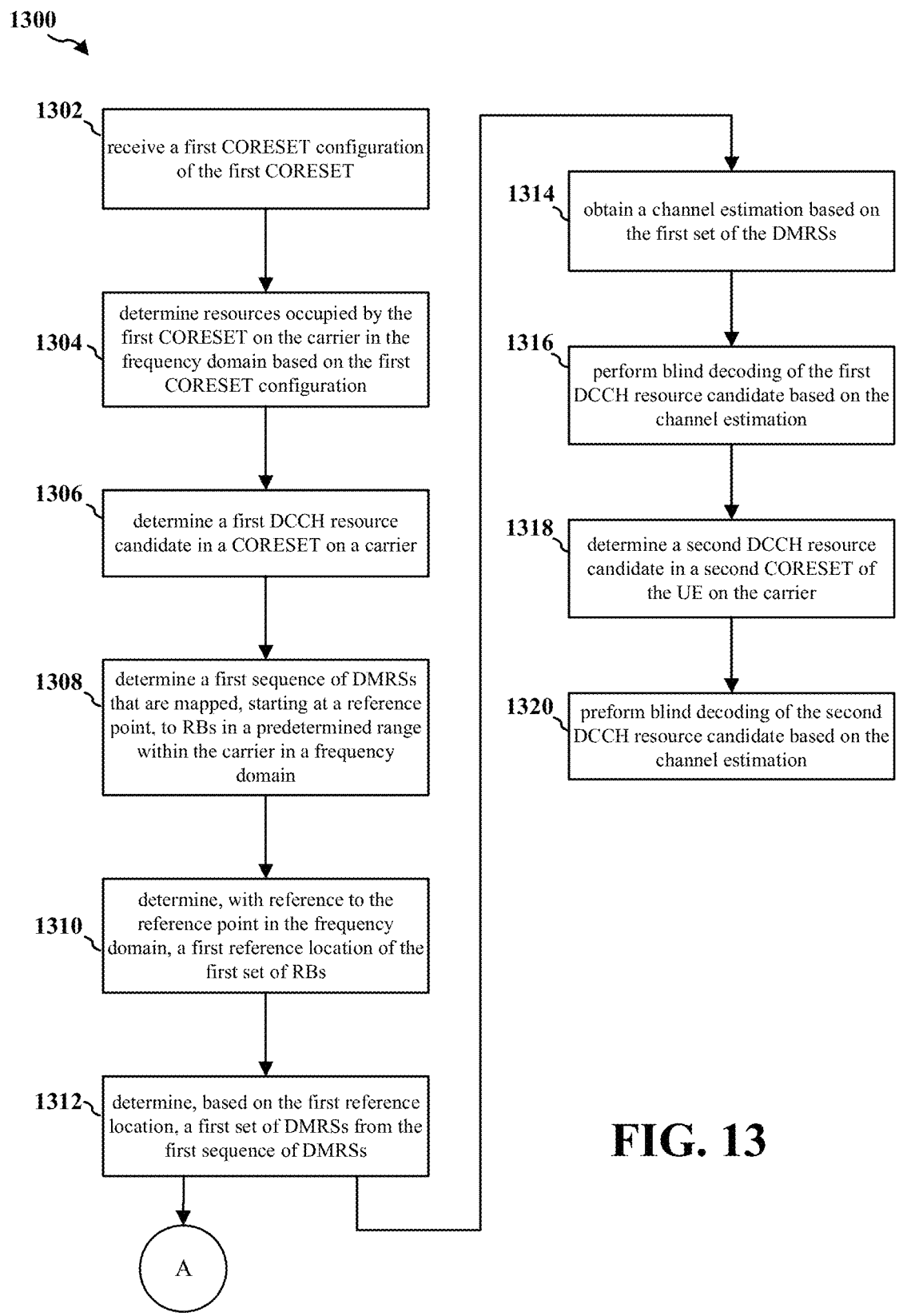
FIG. 13 is a flow chart of a method (process) for determining a DMRS sequence mapping.

FIG. 13 is a flow chart 1300 of a method (process) for determining a DMRS sequence mapping. The method may be performed by a UE (e.g., the UEs 1004-1, 1004-2, ... 1004-G, the UEs 1104-1, 1104-2, ... 1104-G, the apparatus 1502, and the apparatus 1502').

At operation 1302, the UE receives a first CORESET configuration of a first CORESET (e.g., the CORESET 1032) on a carrier (e.g., the carrier 1008). At operation 1304, the UE determines resources occupied by the first CORESET on the carrier in a frequency domain based on the first CORESET configuration.

At operation 1306, the UE determines a first DCCH resource candidate (e.g., the PDCCH resource candidate 1042) in the first CORESET, the first DCCH resource candidate including a first set of RBs (e.g., the RBs 1068, 1070). At operation 1308, the UE determines a first sequence of DMRSs (e.g., the DMRS sequence 1080, the DMRS sequence 1184) that are mapped, starting at a reference point (e.g., the RB 1060, the RB 1156), to RBs in a predetermined range within the carrier in the frequency domain, the predetermined range containing the first DCCH resource candidate in the frequency domain. At operation 1310, the UE determines, with reference to the reference point in the frequency domain, a first reference location of the first set of RBs. At operation 1312, the UE determines, based on the first reference location, a first set of DMRSs (e.g., the DMRSs in the RBs 1068, 1070) from the first sequence of DMRSs, the first set of DMRSs being mapped to the first set of RBs. Subsequently, in certain configurations, the process proceeds to operation 1402 in FIG. 14. In certain configurations, the process proceeds to operation 1314.

At operation 1314, the UE obtains a channel estimation based on the first set of DMRSs. At operation 1316, the UE performs blind decoding of the first DCCH resource candidate based on the channel estimation. At operation 1318, the UE determines a second DCCH resource candidate (e.g., the PDCCH resource candidate 1044) in a second CORESET (e.g., the CORESET 1034) of the UE on the carrier, the second DCCH resource candidate including the first set of RBs (e.g., the RBs 1068, 1070). At operation 1320, the UE preforms blind decoding of the second DCCH resource candidate based on the channel estimation.

In certain configurations, the first reference location is indicated by an integer of RBs away from the reference point. In certain configurations, the reference point is a predetermined point (e.g., the RB 1060) of the first CORESET in the frequency domain. In certain configurations, the predetermined range is a range occupied by the first CORESET in the frequency domain. In certain configurations, the reference point is a predetermined point of a bandwidth part of the carrier assigned to the UE in the frequency domain. In certain configurations, the predetermined range is a range occupied by the bandwidth part (e.g., the bandwidth part 1022-1) in the frequency domain. In certain configurations, the first CORESET configuration is received through a system information transmission.

Figure 14:
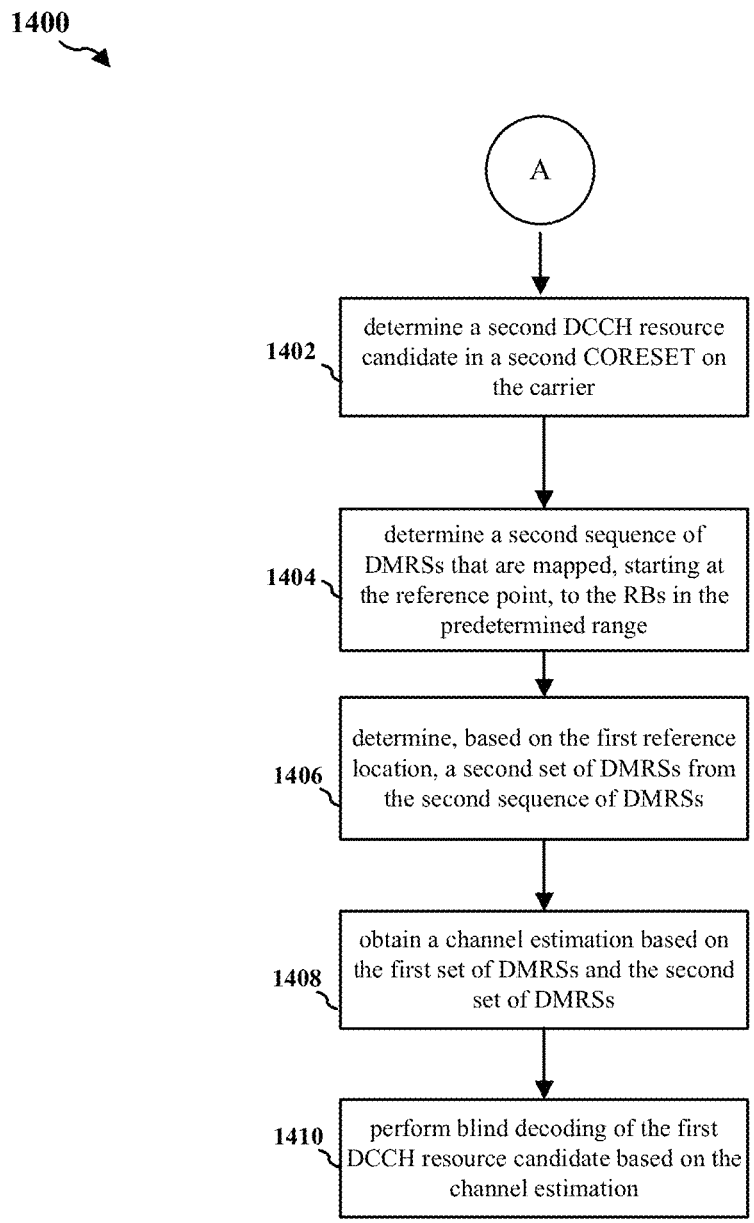
FIG. 14 is another flow chart of a method (process) for determining a DMRS sequence mapping

FIG. 14 is a flow chart 1400 of a method (process) for determining a DMRS sequence mapping following operation 1312 in FIG. 13 in certain configurations. The method may be performed by a UE (e.g., the UEs 1004-1, 1004-2, ... 1004-G, the UEs 1104-1, 1104-2, ... 1104-G, the apparatus 1502, and the apparatus 1502').

In certain configurations, the reference point is a predetermined point (e.g., the RB 1156) of a carrier (e.g., the carrier 1108) in the frequency domain. The predetermined range is a range occupied by the carrier in the frequency domain. In certain configurations, the first CORESET configuration is received through a Radio Resource Control (RRC) signaling specific to the UE.

At operation 1402, UE determines a second DCCH resource candidate (PDCCH resource candidate 1144) in a second CORESET (e.g., CORESET 1134) on the carrier, the second DCCH resource candidate including the first set of RBs (e.g., the RBs 1168, 1170), the second CORESET being assigned to a second UE (e.g., the UE 1104-2). At operation 1404, the UE determines a second sequence of DMRSs (e.g., the DMRS sequence 1186) that are mapped, starting at the reference point, to the RBs in the predetermined range, the second sequence of DMRSs being utilized by the second UE. At operation 1406, the UE determines, based on the first reference location, a second set of DMRSs from the second sequence of DMRSs, the second set of DMRSs being mapped to the first set of RBs. The channel estimation is obtained further based on the second set of DMRSs.

At operation 1408, the UE obtains a channel estimation based on the first set of DMRSs and the second set of DMRSs. At operation 1410, the UE performs blind decoding of the first DCCH resource candidate based on the channel estimation.

Figure 15:
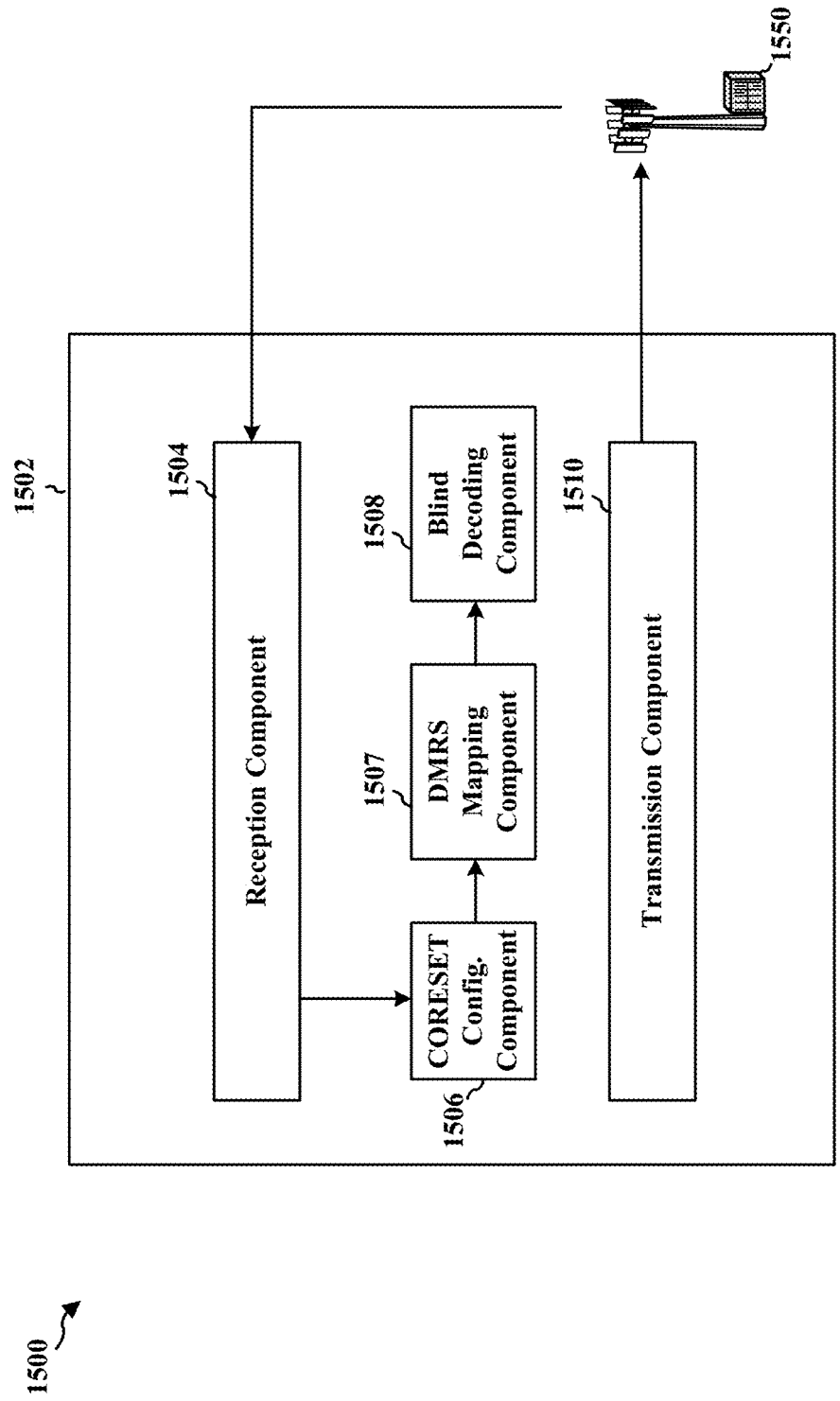
FIG. 15 is a conceptual data flow diagram illustrating the data flow between different components/means in an exemplary apparatus.

FIG. 15 is a conceptual data flow diagram 1500 illustrating the data flow between different components/means in an exemplary apparatus 1502. The apparatus 1502 may be a UE. The apparatus 1502 includes a reception component 1504, a CORESET configuration component 1506, a DMRS mapping component 1507, a blind decoding component 1508, and a transmission component 1510.

In one aspect, the reception component 1504 receives a CORESET configuration of a first CORESET (e.g., the CORESET 732) on a carrier (e.g., the carrier 708) from a base station 1550. The CORESET configuration indicates a reference location (e.g., the bitmap in the first technique referring to FIG. 7) of the first CORESET with reference to a reference point (e.g., the allocation unit 760) in a frequency domain. The CORESET configuration component 1506 determines resources occupied by the first CORESET (e.g., the allocation unit 764 to the allocation unit 768) in the frequency domain of the carrier based on the reference location and the reference point. The blind decoding component 1508 performs blind decoding on DCCH resource candidates in a search space carried by the first CORESET to obtain a down-link control channel.

In certain configurations, the reference location is indicated by an integer of allocation units away from the reference point, each of the allocation units including N resource blocks (RBs), N being an integer greater than 0. In certain configurations, N is 6.

In certain configurations, the reference location is indicated by indications (e.g., the bitmap in the first technique referring to FIG. 7) of whether each resource block (RB) in the carrier or a bandwidth part of the carrier constitutes the first CORESET. In certain configurations, the CORESET configuration is received through a system information transmission. In certain configurations, the CORESET configuration is received through a Radio Resource Control (RRC) signaling specific to the UE.

In certain configurations, the reference point is a predetermined point (e.g., the allocation unit 760) of the carrier in the frequency domain.

In certain configurations, the reference point is a predetermined point (e.g., the allocation unit 860) of a bandwidth part (e.g., the bandwidth part 822-1) of the carrier assigned to the UE in the frequency domain.

In certain configurations, the reference point is a point (e.g., the allocation unit 960) at an offset (e.g., 3 RBs) from a predetermined point (e.g., RB with index 0) of a bandwidth part (e.g., the bandwidth part 922-1) of the carrier assigned to the UE in the frequency domain. In certain configurations, the predetermined point is a starting point of the bandwidth part (e.g., the bandwidth part 922-1). In certain configurations, the reference location is indicated by an integer of allocation units away from the reference point, each of the allocation units including N resource blocks (RBs), N being an integer greater than 0. In certain configurations, the offset is an integer selected from 0 to (N−1) such that a starting point of a second CORESET (e.g., the CORESET 934) is at an integer of allocation units away from the reference point, the second CORESET overlapping with the first CORESET (e.g., the CORESET 932).

In another aspect, the reception component 1504 receives a first CORESET configuration of a first CORESET (e.g., the CORESET 1032) on a carrier (e.g., the carrier 1008) from the base station 1550. The CORESET configuration component 1506 determines resources occupied by the first CORESET on the carrier in a frequency domain based on the first CORESET configuration.

The CORESET configuration component 1506 determines a first DCCH resource candidate (e.g., the PDCCH resource candidate 1042) in the first CORESET, the first DCCH resource candidate including a first set of RBs (e.g., the RBs 1068, 1070). The DMRS mapping component 1507 determines a first sequence of DMRSs (e.g., the DMRS sequence 1080, the DMRS sequence 1184) that are mapped, starting at a reference point (e.g., the RB 1060, the RB 1156), to RBs in a predetermined range within the carrier in the frequency domain, the predetermined range containing the first DCCH resource candidate in the frequency domain. The DMRS mapping component 1507 determines, with reference to the reference point in the frequency domain, a first reference location of the first set of RBs. The DMRS mapping component 1507 determines, based on the first reference location, a first set of DMRSs (e.g., the DMRSs in the RBs 1068, 1070) from the first sequence of DMRSs, the first set of DMRSs being mapped to the first set of RBs.

In certain configurations, the blind decoding component 1508 obtains a channel estimation based on the first set of DMRSs. The blind decoding component 1508 performs blind decoding of the first DCCH resource candidate based on the channel estimation. The CORESET configuration component 1506 determines a second DCCH resource candidate (e.g., the PDCCH resource candidate 1044) in a second CORESET (e.g., the CORESET 1034) of the UE on the carrier, the second DCCH resource candidate including the first set of RBs (e.g., the RBs 1068, 1070). The blind decoding component 1508 preforms blind decoding of the second DCCH resource candidate based on the channel estimation.

In certain configurations, the first reference location is indicated by an integer of RBs away from the reference point. In certain configurations, the reference point is a predetermined point (e.g., the RB 1060) of the first CORESET in the frequency domain. In certain configurations, the predetermined range is a range occupied by the first CORESET in the frequency domain. In certain configurations, the reference point is a predetermined point of a bandwidth part of the carrier assigned to the UE in the frequency domain. In certain configurations, the predetermined range is a range occupied by the bandwidth part (e.g., the bandwidth part 1022-1) in the frequency domain. In certain configurations, the first CORESET configuration is received through a system information transmission.

In certain configurations, the reference point is a predetermined point (e.g., the RB 1156) of a carrier (e.g., the carrier 1108) in the frequency domain. The predetermined range is a range occupied by the carrier in the frequency domain. In certain configurations, the first CORESET configuration is received through a Radio Resource Control (RRC) signaling specific to the UE.

The CORESET configuration component 1506 determines a second DCCH resource candidate (PDCCH resource candidate 1144) in a second CORESET (e.g., CORESET 1134) on the carrier, the second DCCH resource candidate including the first set of RBs (e.g., the RBs 1168, 1170), the second CORESET being assigned to a second UE (e.g., the UE 1104-2). The DMRS mapping component 1507 determines a second sequence of DMRSs (e.g., the DMRS sequence 1186) that are mapped, starting at the reference point, to the RBs in the predetermined range, the second sequence of DMRSs being utilized by the second UE. The DMRS mapping component 1507 determines, based on the first reference location, a second set of DMRSs from the second sequence of DMRSs, the second set of DMRSs being mapped to the first set of RBs. The channel estimation is obtained further based on the second set of DMRSs.

The blind decoding component 1508 obtains a channel estimation based on the first set of DMRSs and the second set of DMRSs. The blind decoding component 1508 performs blind decoding of the first DCCH resource candidate based on the channel estimation.

Figure 16:
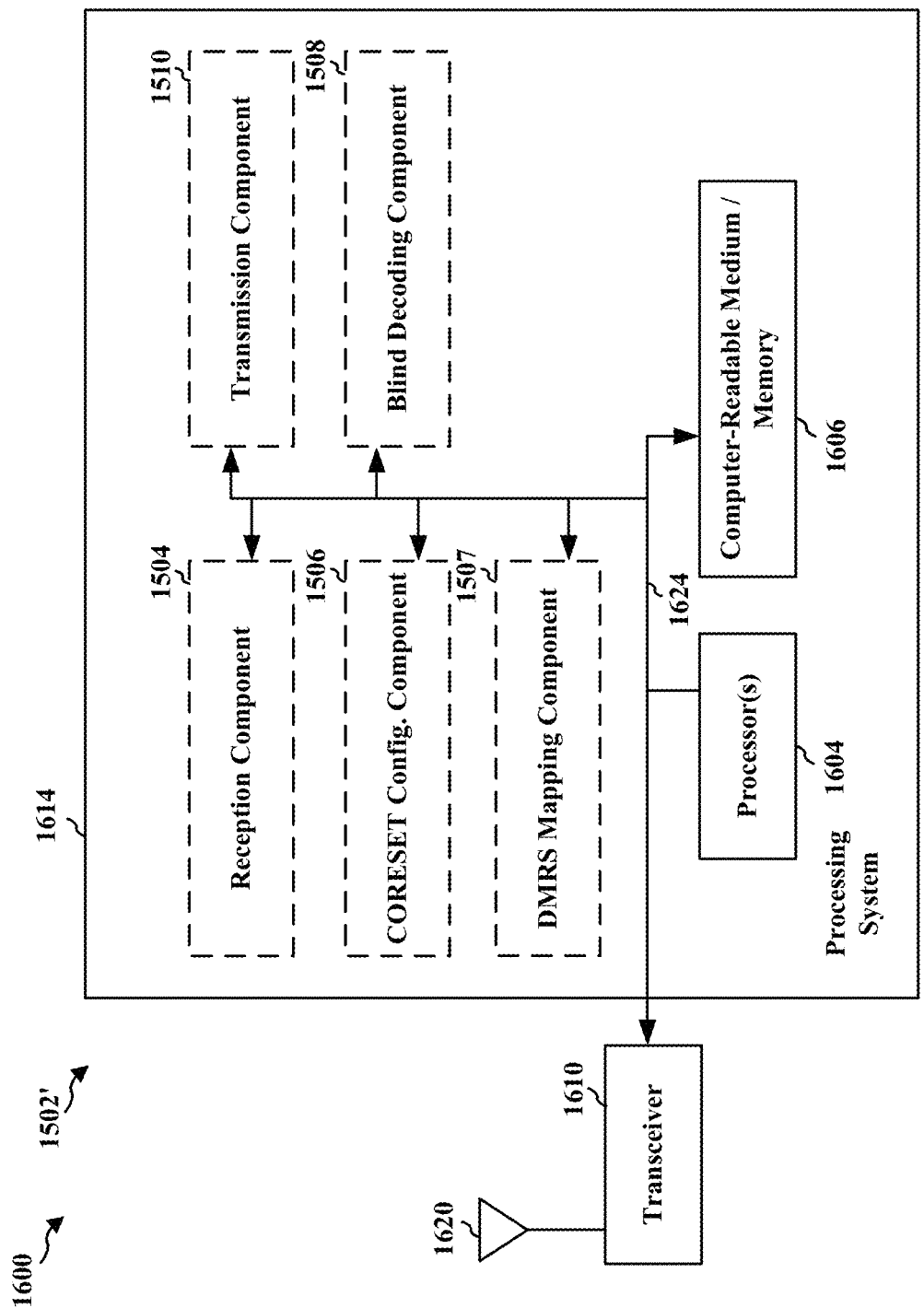
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The apparatus 1502' may be a UE. The processing system 1614 may be implemented with a bus architecture, represented generally by a bus 1624. The bus 1624 may include any number of interconnecting buses and bridges depending on the specific application of the processing system 1614 and the overall design constraints. The bus 1624 links together various circuits including one or more processors and/or hardware components, represented by one or more processors 1604, the reception component 1504, the CORESET configuration component 1506, the DMRS mapping component 1507, the blind decoding component 1508, the transmission component 1510, and a computer-readable medium/memory 1606. The bus 1624 may also link various other circuits such as timing sources, peripherals, voltage regulators, and power management circuits, etc.

The processing system 1614 may be coupled to a transceiver 1610, which may be one or more of the transceivers 354. The transceiver 1610 is coupled to one or more antennas 1620, which may be the communication antennas 352.

The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1510, and based on the received information, generates a signal to be applied to the one or more antennas 1620.

The processing system 1614 includes one or more processors 1604 coupled to a computer-readable medium/memory 1606. The one or more processors 1604 are responsible for general processing, including the execution of software stored on the computer-readable medium/memory 1606. The software, when executed by the one or more processors 1604, causes the processing system 1614 to perform the various functions described supra for any particular apparatus. The computer-readable medium/memory 1606 may also be used for storing data that is manipulated by the one or more processors 1604 when executing software. The processing system 1614 further includes at least one of the reception component 1504, the CORESET configuration component 1506, the DMRS mapping component 1507, the blind decoding component 1508, and the transmission component 1510. The components may be software components running in the one or more processors 1604, resident/stored in the computer readable medium/memory 1606, one or more hardware components coupled to the one or more processors 1604, or some combination thereof. The processing system 1614 may be a component of the UE 350 and may include the memory 360 and/or at least one of the TX processor 368, the RX processor 356, and the communication processor 359.

In one configuration, the apparatus 1502/apparatus 1502' for wireless communication includes means for performing each of the operations of FIG. 12. The aforementioned means may be one or more of the aforementioned components of the apparatus 1502 and/or the processing system 1614 of the apparatus 1502' configured to perform the functions recited by the aforementioned means.

As described supra, the processing system 1614 may include the TX Processor 368, the RX Processor 356, and the communication processor 359. As such, in one configuration, the aforementioned means may be the TX Processor 368, the RX Processor 356, and the communication processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
determining a first physical down link control channel (PDCCH) resource candidate in a first control resource set (CORESET) on a carrier, the first PDCCH resource candidate including a first set of resource blocks (RBs);

determining a first sequence of Demodulation Reference Signals (DMRSs) that are mapped, starting at a reference point, to RBs in a predetermined range within the carrier in a frequency domain, the predetermined range containing the first PDCCH resource candidate in the frequency domain;

determining, with reference to the reference point in the frequency domain, a first reference location of the first set of RBs;

determining, based on the first reference location, a first set of DMRSs from the first sequence of DMRSs, the first set of DMRSs being mapped to the first set of RBs;

obtaining a channel estimation based on the first set of DMRSs; and performing blind decoding of the first PDCCH resource candidate based on the channel estimation.

2. The method of claim 1, further comprising:

receiving a first CORESET configuration of the first CORESET; and determining resources occupied by the first CORESET on the carrier in the frequency domain based on the first CORESET configuration.

3. The method of claim 2, wherein the first reference location is indicated by an integer of RBs away from the reference point.

4. The method of claim 2, wherein the reference point is a predetermined point of the first CORESET in the frequency domain, wherein the predetermined range is a range occupied by the first CORESET in the frequency domain.

5. The method of claim 2, wherein the reference point is a predetermined point of a bandwidth part of the carrier assigned to the UE in the frequency domain, wherein the predetermined range is a range occupied by the bandwidth part in the frequency domain.

6. The method of claim 5, wherein the first CORESET configuration is received through a system information transmission.

7. The method of claim 5, further comprising:

determining a second PDCCH resource candidate in a second CORESET of the UE on the carrier, the second PDCCH resource candidate including the first set of RBs; and preforming blind decoding of the second PDCCH resource candidate based on the channel estimation.

8. An apparatus for wireless communication, the apparatus being a user equipment (UE), comprising:

a memory; and at least one processor coupled to the memory and configured to:

determine a first physical down link control channel (PDCCH) resource candidate in a first control resource set (CORESET) on a carrier, the first PDCCH resource candidate including a first set of resource blocks (RBs);

determine a first sequence of Demodulation Reference Signals (DMRSs) that are mapped, starting at a reference point, to RBs in a predetermined range within the carrier in a frequency domain, the predetermined range containing the first PDCCH resource candidate in the frequency domain;

determine, with reference to the reference point in the frequency domain, a first reference location of the first set of RBs;

determine, based on the first reference location, a first set of DMRSs from the first sequence of DMRSs, the first set of DMRSs being mapped to the first set of RBs;

obtain a channel estimation based on the first set of DMRSs; and perform blind decoding of the first PDCCH resource candidate based on the channel estimation.

9. The apparatus of claim 8, wherein the at least one processor is further configured to:

receive a first CORESET configuration of the first CORESET; and determine resources occupied by the first CORESET on the carrier in the frequency domain based on the first CORESET configuration.

10. The apparatus of claim 9, wherein the first reference location is indicated by an integer of RBs away from the reference point.

11. The apparatus of claim 9, wherein the reference point is a predetermined point of the first CORESET in the frequency domain, wherein the predetermined range is a range occupied by the first CORESET in the frequency domain.

12. The apparatus of claim 9, wherein the reference point is a predetermined point of a bandwidth part of the carrier assigned to the UE in the frequency domain, wherein the predetermined range is a range occupied by the bandwidth part in the frequency domain.

13. The apparatus of claim 12, wherein the first CORESET configuration is received through a system information transmission.

14. The apparatus of claim 12, wherein the at least one processor is further configured to:

determine a second PDCCH resource candidate in a second CORESET of the UE on the carrier, the second PDCCH resource candidate including the first set of RBs; and preform blind decoding of the second PDCCH resource candidate based on the channel estimation.

15. A non-transitory computer-readable medium storing computer executable code for wireless communication of wireless equipment, comprising code to:

determine a first physical down link control channel (PDCCH) resource candidate in a first control resource set (CORESET) on a carrier, the first PDCCH resource candidate including a first set of resource blocks (RBs);

determine a first sequence of Demodulation Reference Signals (DMRSs) that are mapped, starting at a reference point, to RBs in a predetermined range within the carrier in a frequency domain, the predetermined range containing the first PDCCH resource candidate in the frequency domain;

determine, with reference to the reference point in the frequency domain, a first reference location of the first set of RBs;

determine, based on the first reference location, a first set of DMRSs from the first sequence of DMRSs, the first set of DMRSs being mapped to the first set of RBs;

obtain a channel estimation based on the first set of DMRSs; and perform blind decoding of the first PDCCH resource candidate based on the channel estimation.

16. The non-transitory computer-readable medium of claim 15, wherein the code is further configured to:

receive a first CORESET configuration of the first CORESET; and determine resources occupied by the first CORESET on the carrier in the frequency domain based on the first CORESET configuration.

17. The non-transitory computer-readable medium of claim 16, wherein the first reference location is indicated by an integer of RBs away from the reference point.

18. The non-transitory computer-readable medium of claim 16, wherein the reference point is a predetermined point of the first CORESET in the frequency domain, wherein the predetermined range is a range occupied by the first CORESET in the frequency domain.

19. The non-transitory computer-readable medium of claim 16, wherein the reference point is a predetermined point of a bandwidth part of the carrier assigned to the UE in the frequency domain, wherein the predetermined range is a range occupied by the bandwidth part in the frequency domain.

20. The non-transitory computer-readable medium of claim 19, wherein the first CORESET configuration is received through a system information transmission.

* * * * *